(12) United States Patent
Zumbach et al.

(10) Patent No.: US 7,702,548 B2
(45) Date of Patent: Apr. 20, 2010

(54) METHODS FOR ANALYSIS OF FINANCIAL MARKETS

(76) Inventors: Gilles O. Zumbach, Verena Conzett Strasse 21, 8004 Zurich (CH); Ulrich A. Müller, Seefeldstrasse 239, 8008 Zurich (CH); Richard B. Olsen, Wehrenbachhalde, 8053 Zurich (CH)

( * ) Notice: Subject to any disclaimer, the term of this patent is extended or adjusted under 35 U.S.C. 154(b) by 2190 days.

(21) Appl. No.: 09/845,220

(22) Filed: Apr. 30, 2001

(65) Prior Publication Data
US 2002/0161677 A1 Oct. 31, 2002

Related U.S. Application Data

(60) Provisional application No. 60/200,742, filed on May 1, 2000, provisional application No. 60/200,743, filed on May 1, 2000, provisional application No. 60/200,744, filed on May 1, 2000, provisional application No. 60/261,973, filed on Jan. 17, 2001, provisional application No. 60/274,174, filed on Mar. 8, 2001.

(51) Int. Cl.
*G06Q 40/00* (2006.01)
(52) U.S. Cl. .......................................... 705/35; 705/36
(58) Field of Classification Search ............. 705/35–36, 705/37, 39
See application file for complete search history.

(56) References Cited

U.S. PATENT DOCUMENTS

| | | | | |
|---|---|---|---|---|
| 5,787,402 | A * | 7/1998 | Potter et al. | 705/37 |
| 5,884,286 | A * | 3/1999 | Daughtery, III | 705/36 R |
| 5,970,479 | A * | 10/1999 | Shepherd | 705/37 |
| 6,016,483 | A * | 1/2000 | Rickard et al. | 705/36 R |
| 6,321,212 | B1 * | 11/2001 | Lange | 705/36 R |
| 6,832,210 | B1 * | 12/2004 | Li | 705/36 R |
| 2002/0023053 | A1 * | 2/2002 | Szoc et al. | 705/39 |

OTHER PUBLICATIONS

Dacorogna M.M., Müller U.A., Nagler R.J., Olsen R.B., and Pictet O.V., 1993 "A Geographical Model for the Daily and Weekly Seasonal Volatility in the FX Market," *Journal of International Money and Finance*, 12(4), 413-438.

Dacorogna M.M., Müller U.A., Olsen R.B., and Pictet O.V., 1998, "Modeling Short-Term Volatility with GARCH and HARCH Models" published in *Nonlinear Modeling of High Frequency Financial Time Series*, ed. by Christian Dunis and Bin Zhou; John Wiley, Chichester, 161-176.

(Continued)

*Primary Examiner*—Thu Thao Havan
(74) *Attorney, Agent, or Firm*—Ward & Olivo, LLP

(57) ABSTRACT

A preferred embodiment comprises a method for obtaining predictive information (e.g., volatility) for inhomogeneous financial time series. Major steps of the method comprise the following: (1) financial market transaction data is electronically received by a computer over an electronic network; (2) the received financial market transaction data is electronically stored in a computer-readable medium accessible to the computer; (3) a time series z is constructed that models the received financial market transaction data; (4) an exponential moving average operator is constructed; (5) an iterated exponential moving average operator is constructed that is based on the exponential moving average operator; (6) a linear, time-translation-invariant, causal operator Ω[z] is constructed that is based on the iterated exponential moving average operator; (7) values of one or more predictive factors relating to the time series z and defined in terms of the operator Ω[z] are calculated by the computer; and (8) the values calculated by the computer are stored in a computer readable medium.

25 Claims, 16 Drawing Sheets

OTHER PUBLICATIONS

McNeil A.J. and Frey R., 1998, "Estimation of Tail-Related Risk Measures for Heteroscedastic Financial Time Series: An Extreme Value Approach," Preprint from the ETH Zürich, Aug. 27, 1-28.

J.P. Morgan, 1996, "RiskMetrics"—Technical Document, Technical Report, J.P. Morgan and International Marketing—Reuters Ltd.

Müller U.A., Dacorogna M.M., Davé R.D., Olsen R.B., Pictet O.V., and von Weizsäcker J.E., 1996, "Volatilities of Different Time Resolutions—Analyzing the Dynamics of Market Components," *Journal of Empirical Finance*, 4(2-3), 213-239.

Pictet O.V., Dacorogna M.M., Müller U.A., Olsen R.B., and Ward J.R., 1992, "Real-Time Trading Models for Foreign Exchange Rates," *Neural Network World*, 2(6), 713-744.

Hull, J.C., *Options, Futures and Other Derivatives*, (4th ed.) Prentice Hall, 1999, Ch. 14.

Pictet O.V., Dacorogna M.M., Müller U.A., "Hill, Bootstrap and Jackknife Estimators for Heavy Tails", in *A Practical Guide to Heavy Tails: Statistical Techniques for Analyzing Heavy Tailed Distributions*, R.J. Adler, R.E. Feldman & M.S. Taqqu (eds.), Birkhauser, Boston 1998.

Müller U.A., Dacorogna M.M., Pictet O.V., "Heavy Tails in High-Frequency Financial Data", in *A Practical Guide to Heavy Tails: Statistical Techniques for Analyzing Heavy Tailed Distributions*, R.J. Adler, R.E. Feldman & M.S. Taqqu (eds.), Birkhauser, Boston 1998.

Dacorogna M.M., Gencay R., Muller, U., Olsen, R.B. and Pictet, O.V., *An Introduction to High Frequency Finance*, Academic Press 2001, Ch. 9.

Britten-Jones M., Schaefer S.M., "Non-Linear Value-at-Risk," *European Finance Review*, 1999, 2 (2).

\* cited by examiner

METHODS FOR ANALYSIS OF FINANCIAL MARKETS

CROSS REFERENCE TO RELATED APPLICATIONS

This application claims priority to U.S. Provisional Application No. 60/200,742, filed May 1, 2000; U.S. Provisional Application No. 60/200,743, filed May 1, 2000; U.S. Provisional Application No. 60/200,744, filed May 1, 2000; U.S. Provisional Application No. 60/261,973, filed Jan. 17, 2001; and U.S. Provisional Application No. 60/274,174, filed Mar. 8, 2001. The contents of the above applications are incorporated herein in their entirety by reference.

FIELD OF THE INVENTION

The subject invention is related to inhomogeneous time series analysis, and more particularly to the analysis of high-frequency financial data, such as foreign exchange data.

BACKGROUND

Time series are the common mathematical framework used to represent the world of economics and finance. Among time series, the first important classification can be done according to the spacing of data points in time. Regularly spaced time series are called homogeneous, irregularly spaced series are inhomogeneous. An example of a homogeneous time series is a series of daily data, where the data points are separated by one day (on a business time scale, which omits the weekends and holidays).

In most references on time series analysis, the time series to be treated are restricted to the filed of homogeneous time series (see, e.g., Granger C. W. J. and Newbold P., 1977, *Forecasting economic time series*, Academic Press, London; Priestley M. B., 1989, *Non-linear and non-stationary time series analysis*, Academic Press, London; Hamilton J. D., 1994, *Time Series Analysis*, Princeton University Press, Princeton, N.J.) (hereinafter, respectively, Granger and Newbold, 1977; Priestley, 1989; Hamilton, 1994). This restriction induces numerous simplifications, both conceptually and computationally, and was justified before fast, inexpensive computers and high-frequency time series were available.

Current empirical research in finance is confronted with an ever-increasing amount of data, caused in part by increased computer power and communication speed. Many time series can be obtained at high frequency, often at market tick-by-tick frequency. These time series are inhomogeneous, since market ticks arrive at random times. Inhomogeneous time series by themselves are conceptually simple; the difficulty lies in efficiently extracting and computing information from them.

SUMMARY

There is thus a need for methods of analyzing inhomogeneous time series. Time series based on foreign exchange rates represent a standard example of the practical application of such methods. In practice, the methods described herein are also suitable for applications to homogeneous time series. Given a time series z, such as an asset price, the general point of view is to compute another time series, such as the volatility of the asset, by the application of an operator $\Omega[z]$. There is a need for a method of applying a set of basic operators that can be combined to compute more sophisticated quantities (for example, different kinds of volatility or correlation). In such a method, a few important considerations must be kept in mind. First, the computations must be efficient. Even if powerful computers are becoming cheaper, typical tick-by-tick data in finance is 100 or even 10,000 times denser than daily data. Clearly, one cannot afford to compute a full convolution for every tick. The basic workhorse is the exponential moving average (EMA) operator (described below), which can be computed very efficiently through an iteration formula. A wealth of complex but still efficient operators can be constructed by combining and iterating the basic operators described.

Second, stochastic behavior is the dominant characteristic of financial processes. For tick-by-tick data, not only the values but also the time points of the series are stochastic. In this random world, point-wise values are of little significance and we are more interested in average values inside intervals. Thus the usual notion of return also has to be changed. With daily data, a daily return is computed as $r_i = p_i - p_{i-1}$, i.e., as a point-wise difference between the price today and the price yesterday. With high-frequency data, a better definition of the daily return is the difference between the average price of the last few hours and an average price from one day ago. In this way, it is possible to build smooth variables well-suited to random processes. The calculus has to be revisited in order to replace point-wise values by averages over some time intervals.

Third, analyzing data typically involves a characteristic time range; a return $r[\tau]$, for example, is computed on a given time interval $\tau$. With high-frequency data, this characteristic time interval can vary from few minutes to several weeks. We have been careful to make explicit all these time range dependencies in the formulation of operators used in the described methods.

Finally, we often want smooth operators. Of course, there is a singularity at $t=\text{now}$, corresponding to the arrival of new information. This new information must be incorporated immediately, and therefore, the operators may have a jump behavior at $t=\text{now}$. Yet, aside from this fundamental jump created by the advance of events, it is better to have continuous and smooth operators. A simple example of a discontinuous operator is an average with a rectangular weighting function, say of range $\tau$. The second discontinuity at $\text{now}-\tau$, corresponding to forgetting events, is unnecessary and creates spurious noise. Instead, a preferred embodiment uses moving average weighting functions (kernels) with a smooth decay to zero.

The above-listed goals are satisfied by the subject invention. A preferred embodiment comprises a method to obtain predictive information (e.g., volatility) for inhomogeneous financial time series. Major steps of the method comprise the following: (1) financial market transaction data is electronically received by a computer over an electronic network; (2) the received financial market transaction data is electronically stored in a computer-readable medium accessible to the computer; (3) a time series z is constructed that models the received financial market transaction data; (4) an exponential moving average operator is constructed; (5) an iterated exponential moving average operator is constructed that is based on the exponential moving average operator; (6) a time-translation-invariant, causal operator $\Omega[z]$ is constructed that is based on the iterated exponential moving average operator; (7) values of one or more predictive factors relating to the time series z and defined in terms of the operator $\Omega[z]$ are calculated by the computer; and (8) the values calculated by the computer are stored in a computer readable medium.

Various predictive factors are described below, and specifically comprise return, momentum, and volatility. Other predictive factors will be apparent to those skilled in the art.

The above briefly described embodiment is only one of several preferred embodiments described herein, and should not be interpreted as representing the invention as a whole, or as the "thrust" of the invention. Descriptions of other, equally important, embodiments have been omitted from this Summary merely for conciseness. Of particular note is the fact that the described method is applicable to any time series data, not just FX data.

with τ=24 hours ("24 h"), and the point-wise return x(t)−x(t−24 h).

Figure 8:
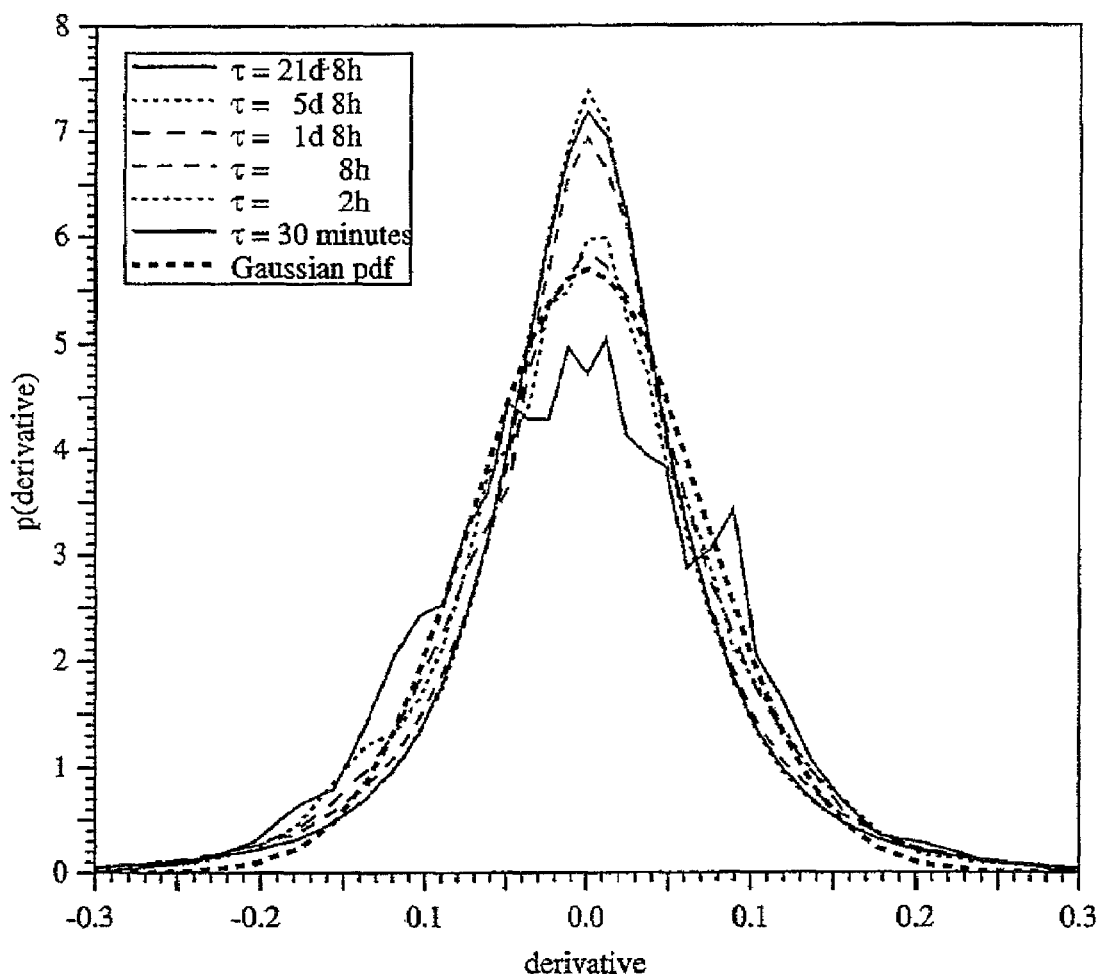

FIG. 8 is a graph of an annualized derivative D[τ, γ=0.5; x] for USD/CHF from 1 Jan. 1988 to 1 Nov. 1998.

Figure 9:
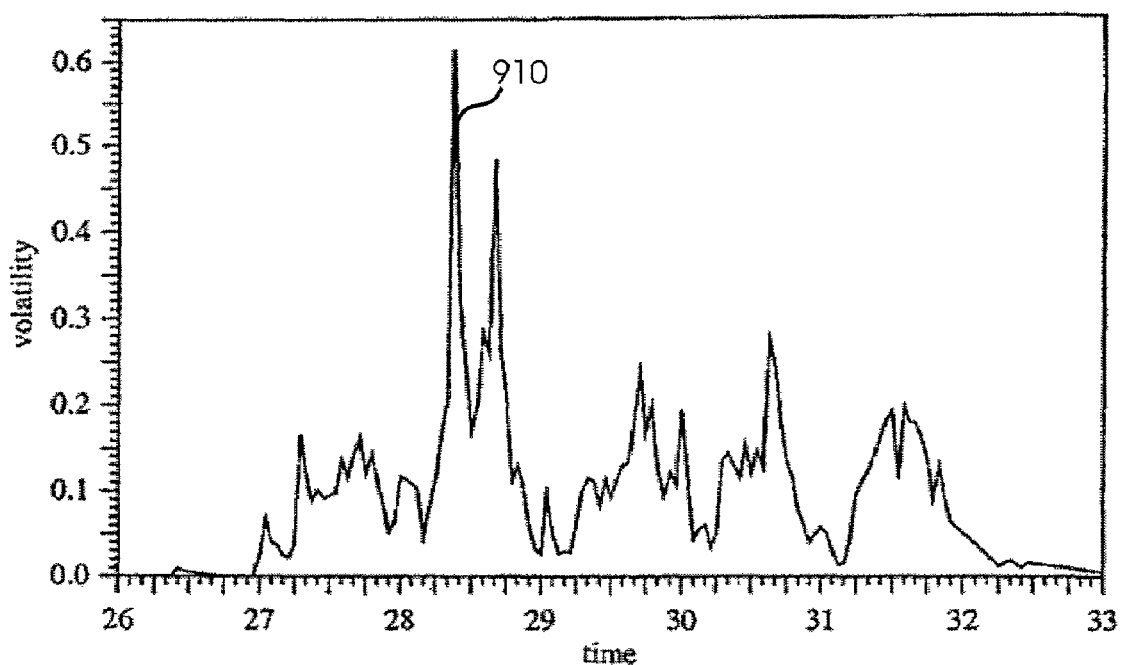

FIG. 9 shows an annualized volatility computed as MNorm [τ/2; D [τ/32, γ=0.5; x]] with τ=1h.

Figure 10:
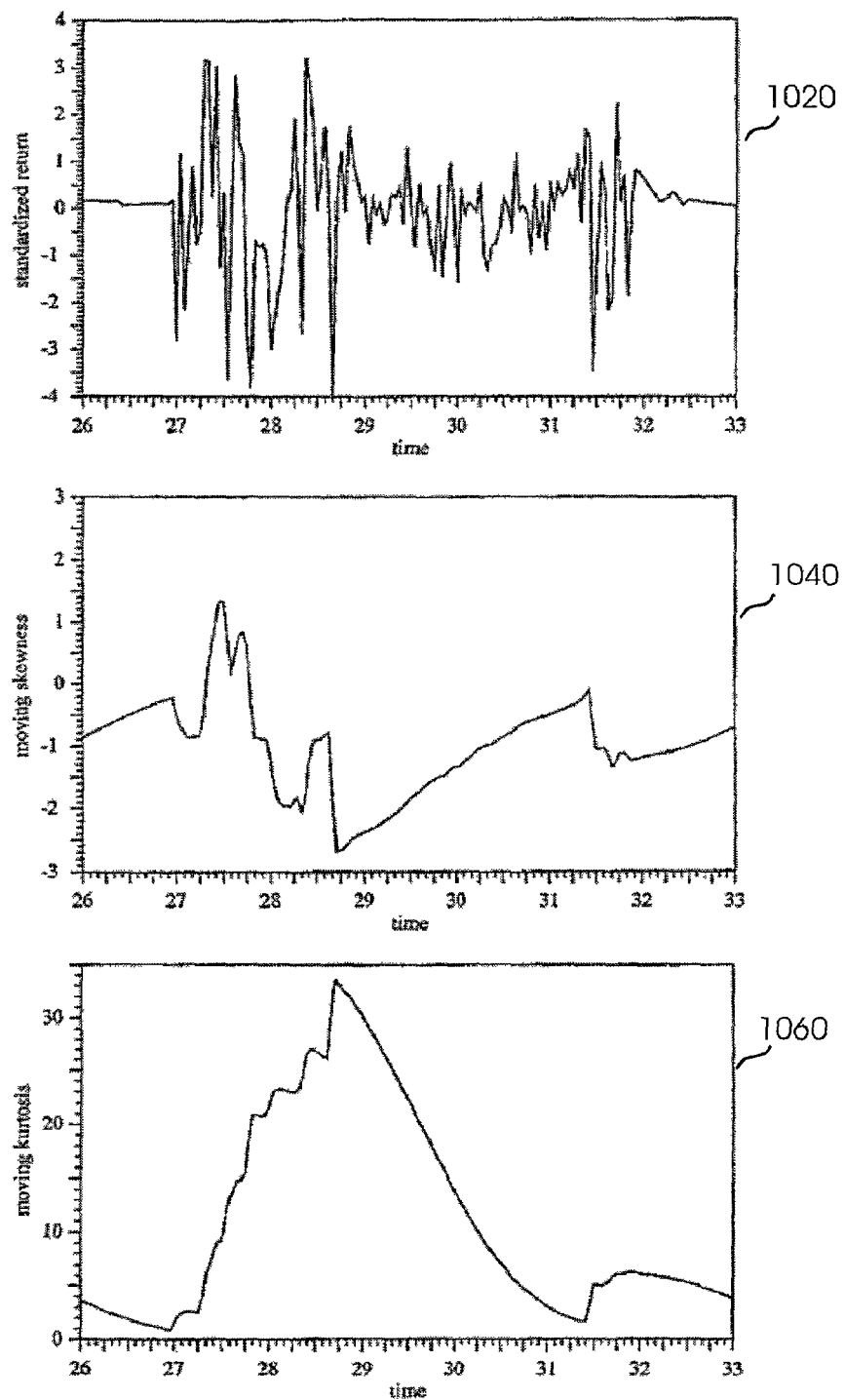

FIG. 10 shows plots of a standardized return, a moving skewness, and a moving kurtosis.

Figure 11:
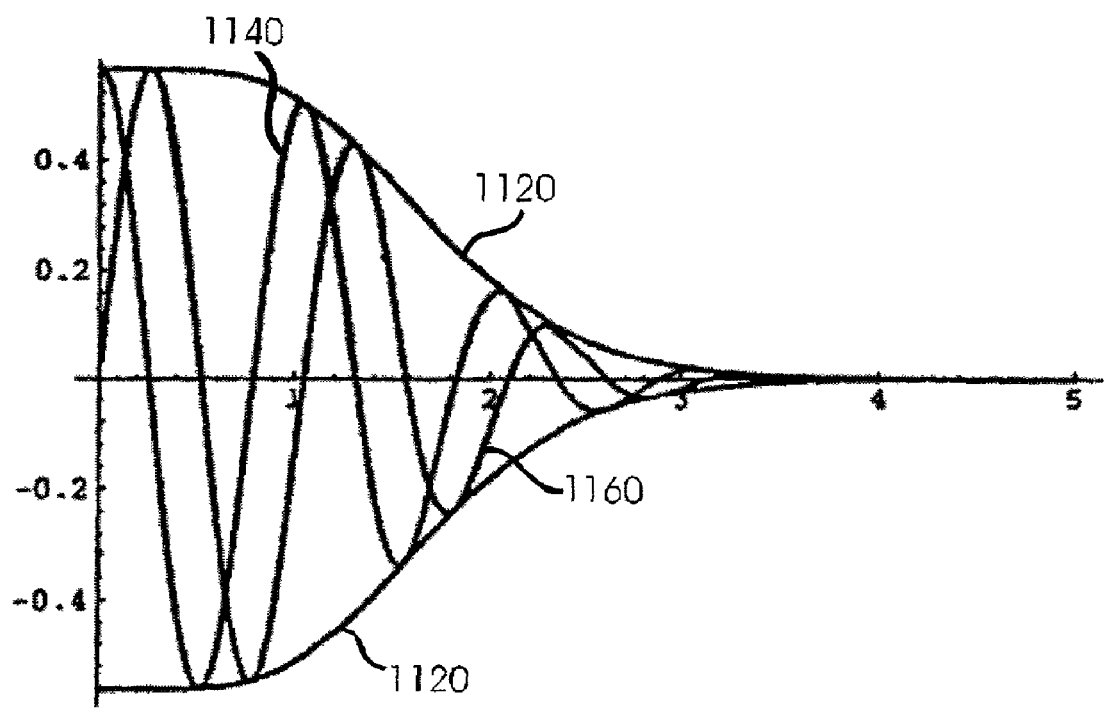

FIG. 11 plots a kernel wf(t) for a windowed Fourier operator, for n=8 and k=6.

Figure 12:
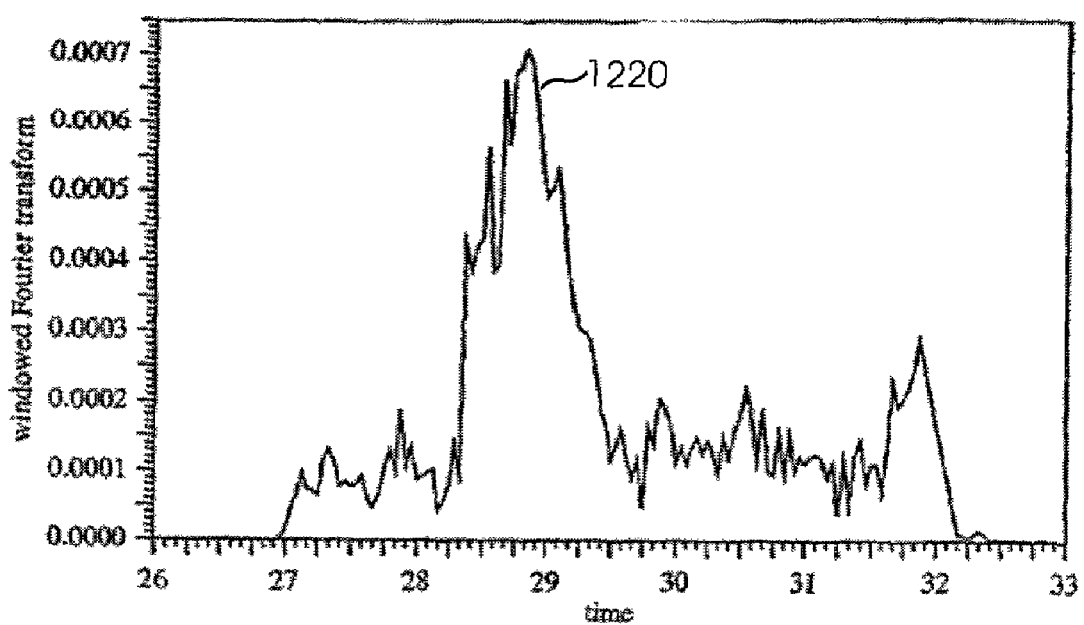

FIG. 12 shows a plot of a normed windowed Fourier transform for the example week, with τ=1 hour, k=6, and n=8.

Figure 13:
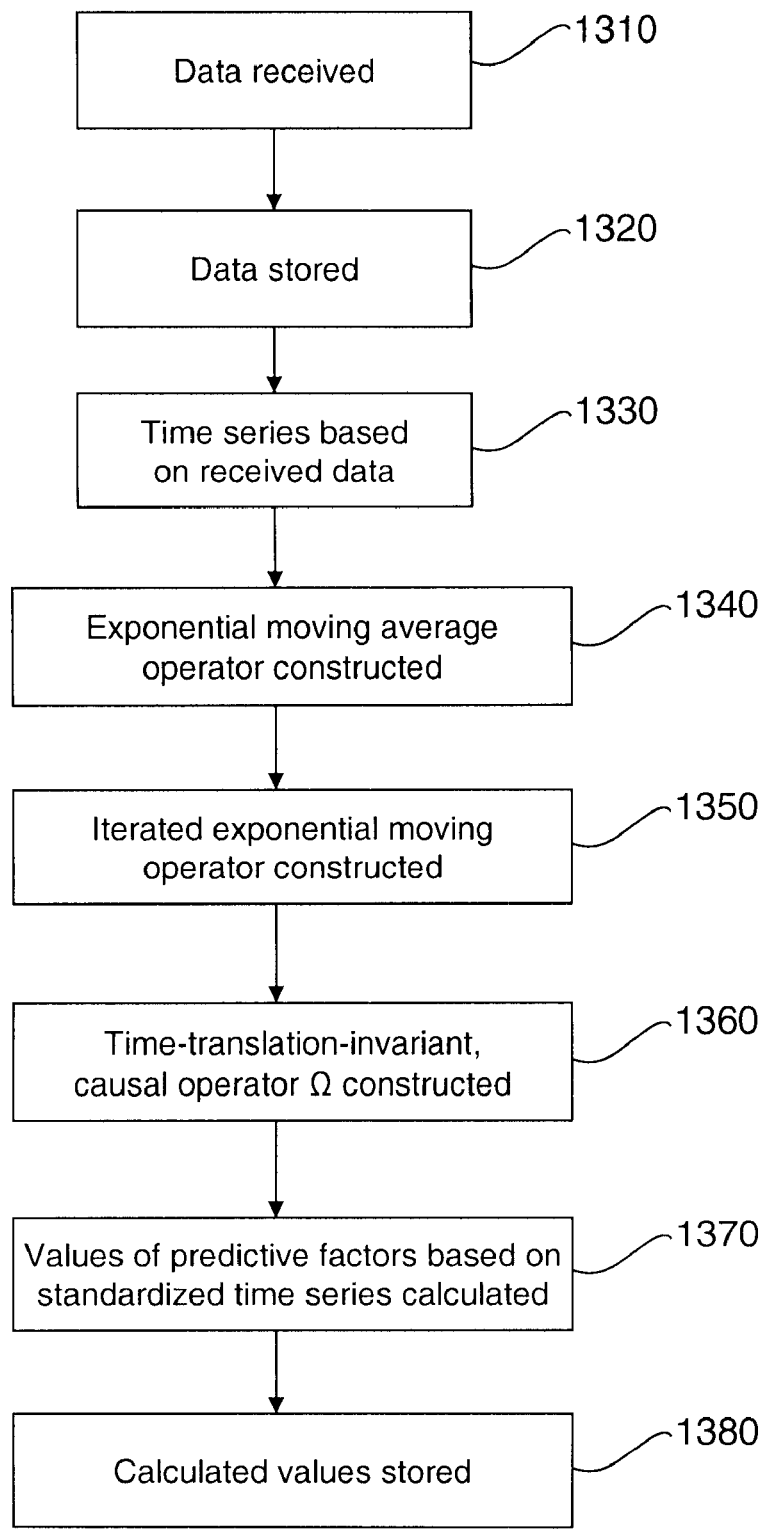

FIG. 13 illustrates major steps of a preferred embodiment.

Figure 14:
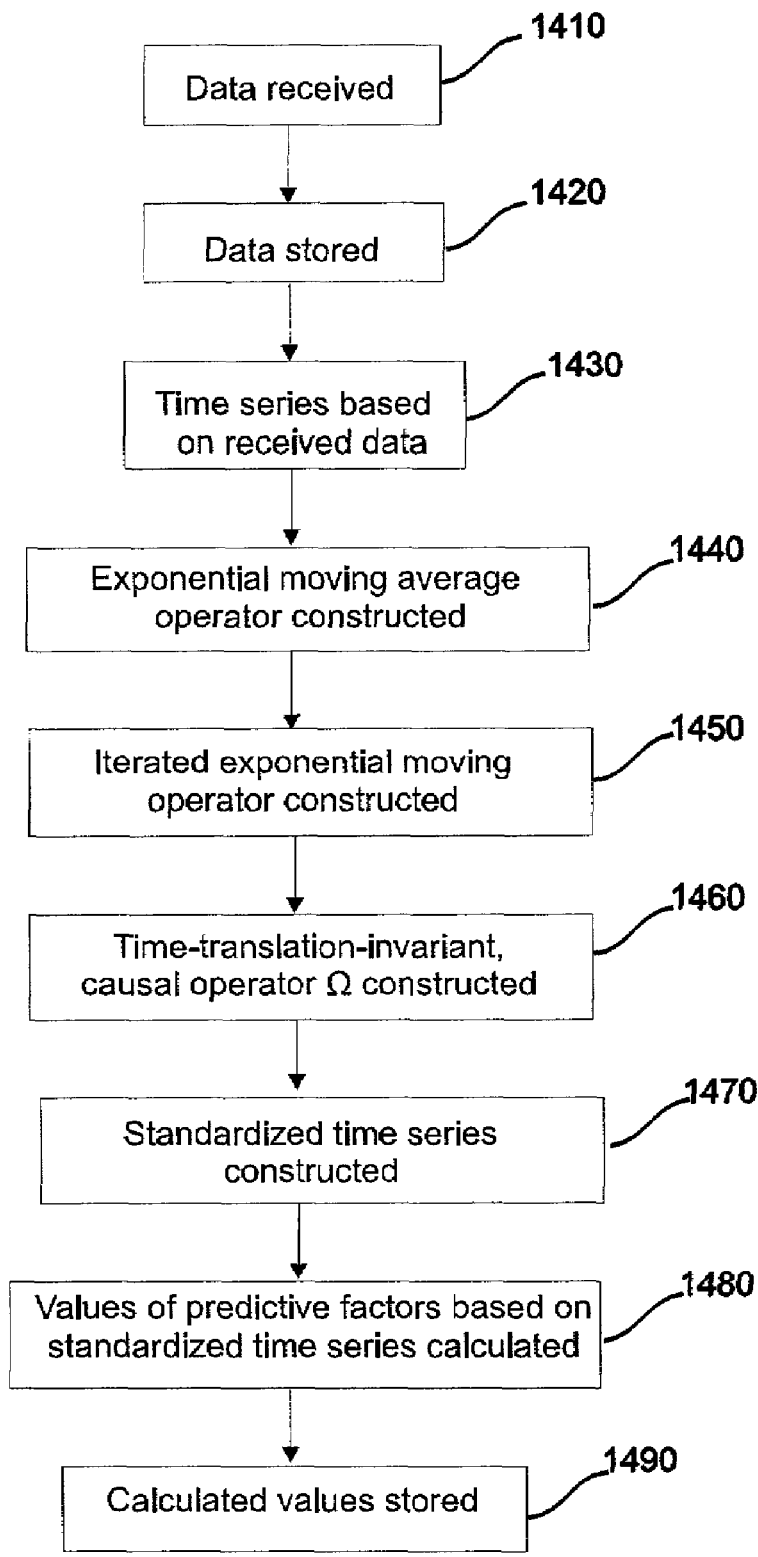

FIG. 14 illustrates major steps of a second preferred embodiment.

Figure 15:
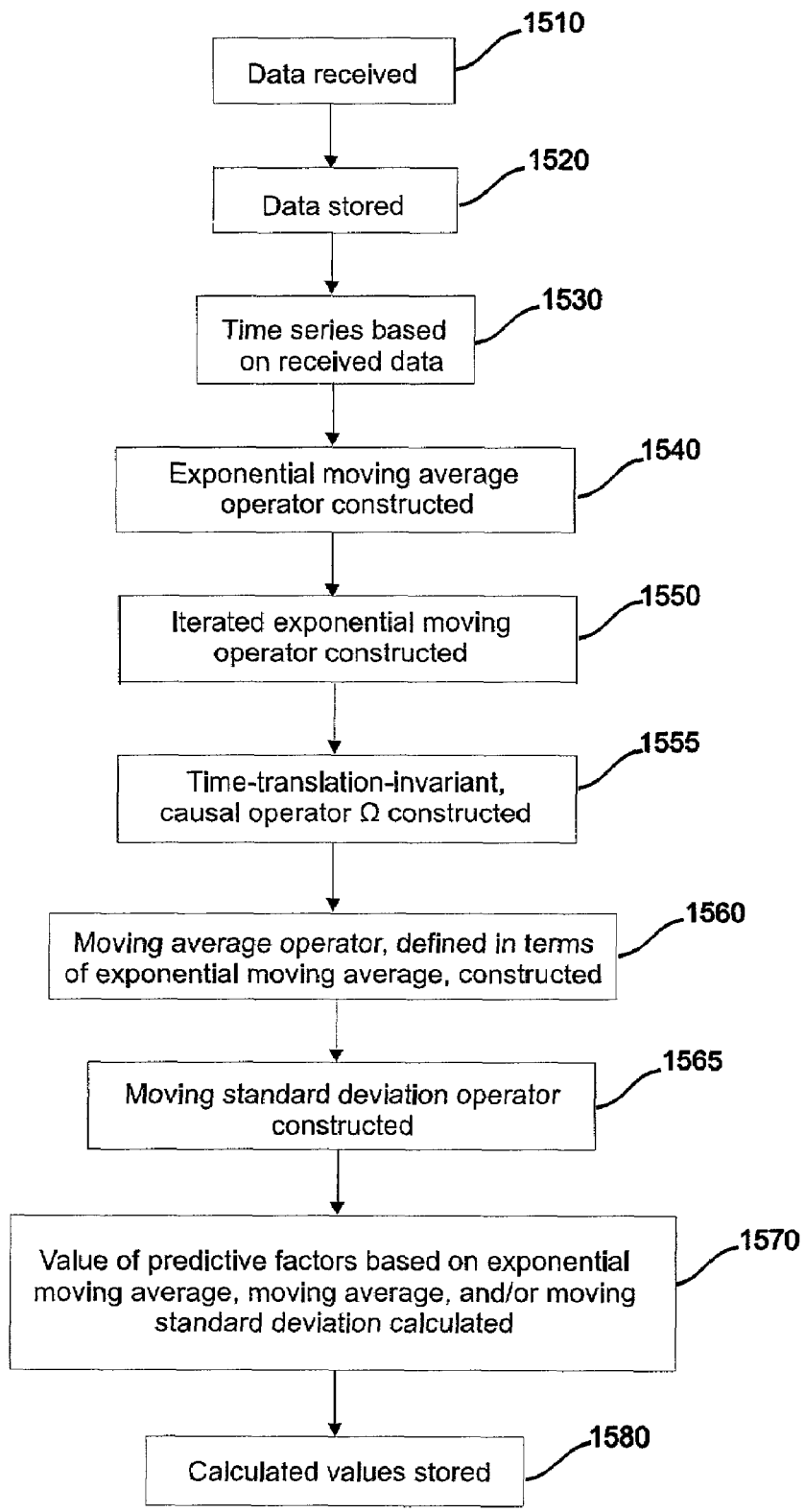

FIG. 15 illustrates major steps of a third preferred embodiment.

Figure 16:
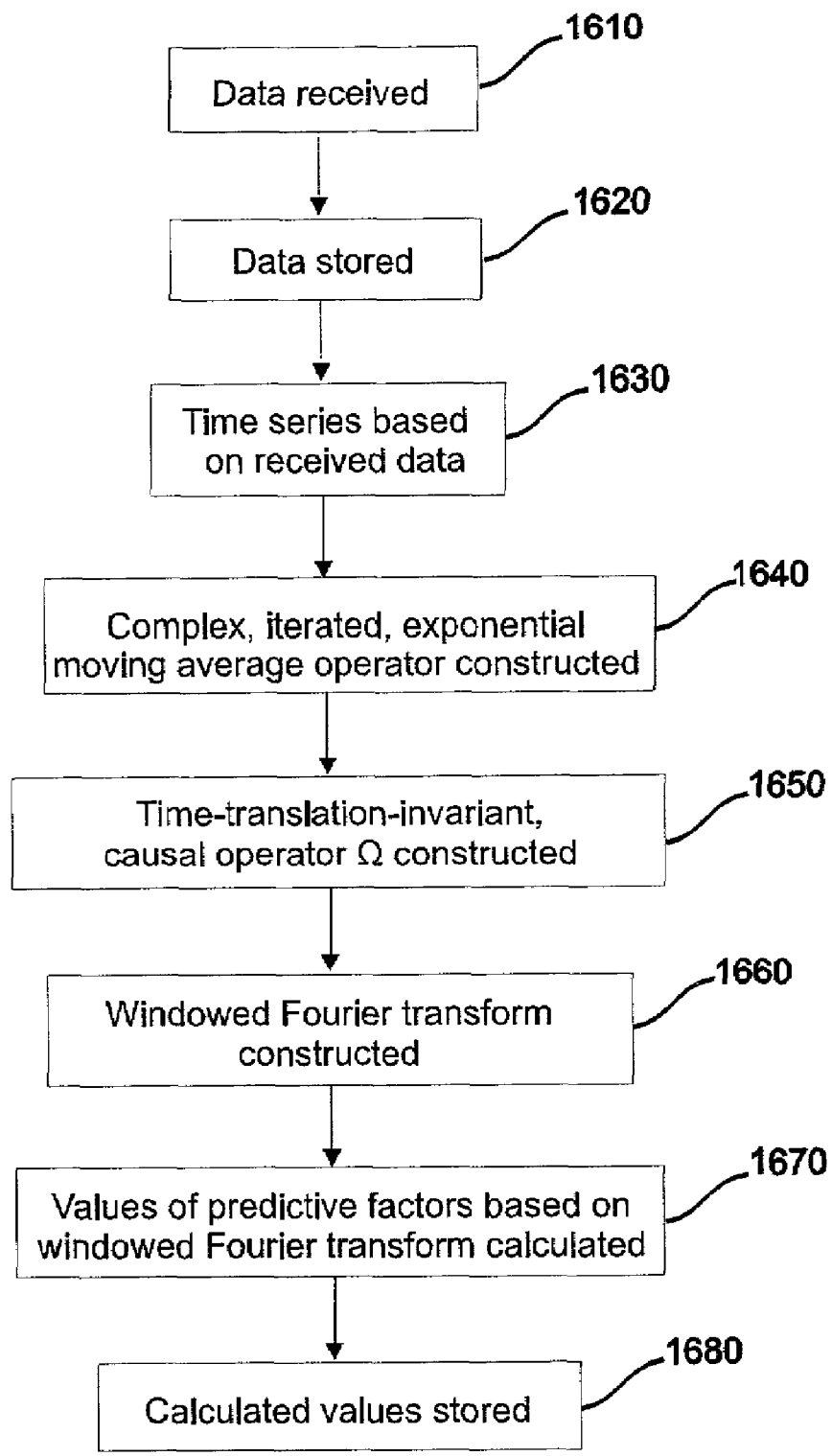

FIG. 16 illustrates major steps of a fourth preferred embodiment.

DETAILED DESCRIPTION OF PREFERRED EMBODIMENTS

1 Introduction

The generalization to inhomogeneous time series introduces a number of technical peculiarities. Because of their time-translation invariance, all macroscopic operators can be represented by convolutions. A convolution is defined as an integral, so the series should be defined in continuous time. Actual data is known only at discrete sampling times, so some interpolation needs to be used in order to properly define the convolution integral. The same problem is present when constructing an artificial homogeneous time series from inhomogeneous data. Another technical peculiarity originates from the fact that our macroscopic operators are ultimately composed of iterated moving averages. All such EMA operators have non-compact kernels: the kernels decay exponentially fast, but strictly speaking they are positive. This implies an infinite memory; a build-up must be done over an initialization period before the value of an operator becomes meaningful. All the above points are discussed in detail below.

High-frequency data in finance has a property that creates another technical difficulty: strong intra-day and intra-week seasonalities, due to the daily and weekly pattern of human activities. A powerful deseasonalization technique is needed, such as a transformed business time scale (see Dacorogna, M. M., Müller, U. A., Nagler, R. J., Olsen, R. B., and Pictet, O. V., 1993, *A geographical model for the daily and weekly seasonal volatility in the FX market*, Journal of International Money and Finance, 12(4), 413-438.) (hereinafter Dacorogna et al., 1993). Essentially, this scale is a continuous-time generalization of the familiar daily business time scale (which contains five days per week, Saturdays and Sundays omitted). A continuous business time scale θ allows us to map a time interval dt in physical time to an interval dθ in business time, where dθ/dt is proportional to the expected market activity. All the techniques presented in this paper can be based on any business time scale. The required modification is to replace physical time intervals with corresponding business time intervals. As this extension is straightforward to those skilled in the art, all the formulae are given in physical time and a few remarks on scaled time are made when the extension or its consequences are nonobvious.

The plan of this description is as follows: The notation is fixed in Section 2 and the main theoretical considerations are given in Section 3. A set of convenient macroscopic operators, including different moving averages and derivatives are given in Section 4. Armed with powerful basic operators, it is then easy to introduce novel methods of calculating time series predictive factors such as moving volatility, correlation, moving skewness and kurtosis, and to generalize the described methods to complex-valued operators. In Section 5, we describe preferred implementations of the method.

Figure 1:
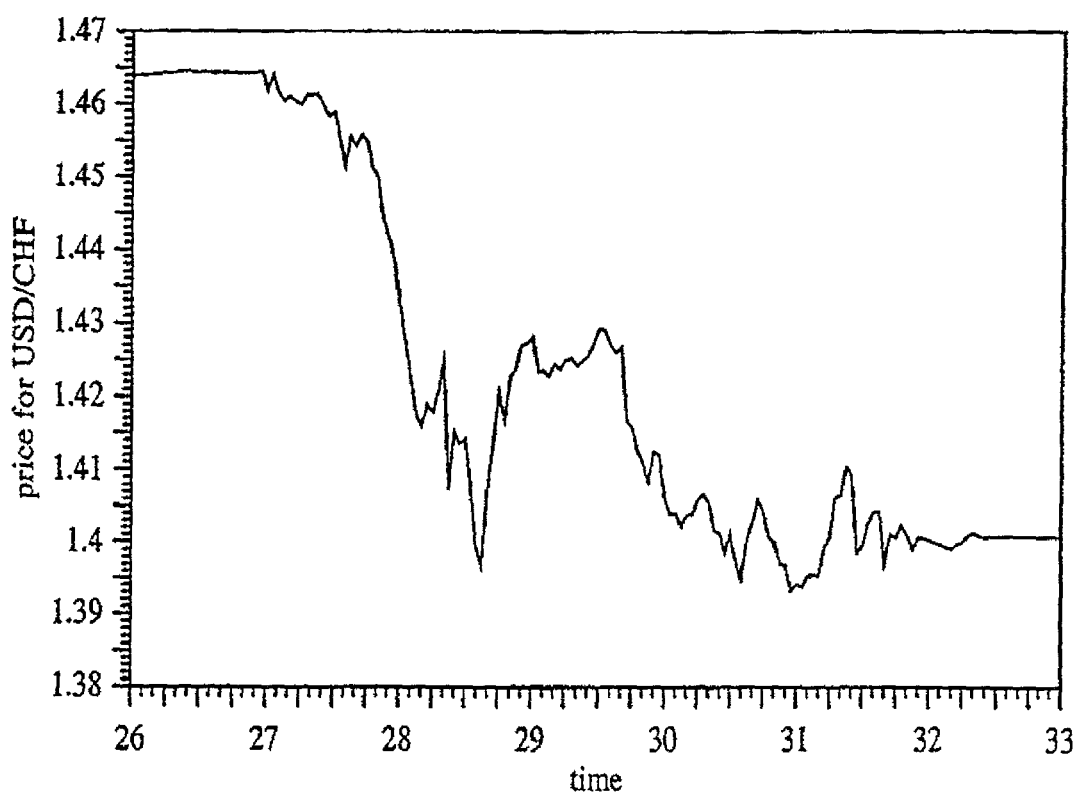
FIG. 1 is a graph of the foreign exchange rate for USD/CHF for the week from Sunday, Oct. 26, to Sunday, Nov. 2, 1997.

Examples are given with data taken from the foreign exchange (FX) market. When not specified, the data set is USD/CHF for the week from Sunday, Oct. 26, 1997 to Sunday, Nov. 2. This week has been selected because on Tuesday, Oct. 28, 1997, some Asian stock markets crashed, causing turbulences in many markets around the world, including the FX market. Yet, the relation between a stock market crash originating in Asia and the USD/CHF foreign exchange rate is quite indirect, making this example interesting. The prices of USD/CHF for the example week are plotted in FIG. 1. All the figures for this week have been computed using high-frequency data; the results have finally been sampled each hour using a linear interpolation scheme. The computations have been done in physical time, therefore exhibiting the full daily and weekly seasonalities contained in the data. FIG. 1 shows the FX rate of USD/CHF (U.S. dollars to Swiss Francs) for the week of Sunday, Oct. 26 to Sunday, Nov. 2, 1997. On the time axis, the labels correspond to the day in Oct., with the points 32 and 33 corresponding to Nov. 1 and 2. From the market quote containing bid and ask prices, the (geometric) middle price was computed as $\sqrt{bid \cdot ask}$.

Finally, we want to emphasize that the techniques described herein can be applied to a wide range of statistical computations in finance—for example, the analysis needed in risk management. A well-known application can be found in (Pictet O. V., Dacorogna M. M., Müller U. A., Olsen R. B.,, and Ward J. R., 1992, *Real-time trading models for foreign exchange rates*, Neural Network World, 2(6), 713-744.) (hereinafter Pictet et al., 1992). Further, these techniques can also be applied to any time series data (e.g., commodity prices or temperature data), not just financial data.

2 Notation and Mathematical Preliminaries

The letter z is used herein to represent a generic time series. The elements, or ticks, $(t_i, z_i)$ of a time series z consist of a time $t_i$ and a scalar value $z_i$. The generalization to multivariate inhomogeneous time series is straightforward (except for the business time scale aspect). The value $z_i=z(t_i)$ and the time point $t_i$ constitute the i-th element of the time series z. The sequence of sampling (or arrival) times is required to be growing: $t_i>t_{i-1}$. The strict inequality is required in a true univariate time series and is theoretically always true if the information arrives through one channel. In practice, the arrival time is only known with a finite precision (say, one second), and two ticks may well have the same arrival time. Yet, for most of the methods described herein, the strict monotonicity of the time process is not required. A general time series is inhomogeneous, meaning that the sampling times are irregular. For an homogeneous time series, the sampling times are regularly spaced: $t_i-t_{i-1}=\delta t=$constant. If a time series depends on some parameters $\theta$, these are made explicit between square brackets, $z[\theta]$.

An operator $\Omega$ from the space of time series into itself is denoted by $\Omega[z]$. The operator may depend on some parameters $\Omega[\theta;z]$. The value of $\Omega[z]$ at time t is $\Omega[z](t)$. For linear operators, a product notation $\Omega z$ is also used. The average over a whole time series of length T is denoted by $E[z]:=1T\int dt\, z(t)$. The probability density function (pdf) of z is denoted p(z). A synthetic regular (or homogeneous) time series (RTS), spaced by $\delta t$, derived from the irregular time series z, is noted $RTS[\delta t;z]$. A standardized time series for z is denoted $\hat{z}=(z-E[z])/\sigma[z]$, where $\sigma[z]^2=E[(z-E[z])^2]$.

The letter x is used to represent the logarithmic middle price time series $x=(\ln p_{bid}+\ln p_{ask})/2=\ln\sqrt{p_{bid}p_{ask}}$.

3 Convolution Operators: General Considerations

3.1 Linear Operators

If an operator is linear, time-translation invariant and causal, it can be represented by a convolution with a kernel $\omega(t)$:

$$\Omega[z](t) = \int_{-\infty}^{t} dt'\,\omega(t-t')z(t') \quad (1)$$
$$= \int_{0}^{\infty} dt'\,\omega(t')z(t-t').$$

The kernel $\omega(t)$ is defined only on the positive semi-axis $t\geq 0$, and should decay to t large enough. With this convention for the convolution, the weight given to past events corresponds to the value of the kernel for positive argument. The value of the kernel $\omega(t-t')$ is the weight of events in the past, at a time interval $t-t'$ from t. In this convolution, $z(t')$ is a continuous function of time. Actual time series z are known only at the sampling time $t_i$ and should be interpolated between sampling points. Many interpolation procedures for the value of z(t) between $t_{i-1}$ and $t_i$ can be defined, but three are used in practice: previous value $z(t)=z_{i-1}$, next value $z(t)=z_i$, and linear interpolation $z(t)=\alpha(t)z_{i-1}+[1-\alpha(t)]z_i$ with $\alpha(t)=(t_i-t)/(t_i-t_{i-1})$.

The linear interpolation leads to a continuous interpolated function. Moreover, linear interpolation defines the mean path of a random walk, given the start and end values. Unfortunately, it is non-causal, because in the interval between $t_{i-1}$ and $t_i$, the value at the end of the interval $z_i$ is used. Only the previous-value interpolation is causal, as only the information known at $t_{i-1}$ is used in the interval between $t_{i-1}$ and $t_i$. Any interpolation can be used for historical computations, but for the real-time situation, only the causal previous-value interpolation is defined. In practice, the interpolation scheme is almost irrelevant for good macroscopic operators—i.e., if the kernel has a range longer than the typical sampling rate.

The kernel $\omega(t)$ can be extended to all $t\in R$, with $\omega(t)=0$ for $t<0$. This is useful for analytical computation, particularly when the order of integral evaluations has to be changed. If the operator $\Omega$ is linear and time-translation invariant but non-causal, the same representation can be used except that the kernel may be non-zero on the whole time axis.

Two broad families of operators that share general shapes and properties are often used. An average operator has a kernel that is non-negative, $\omega(t)\geq 0$, and normalized to unity, $\int dt\,\omega(t)=1$. This implies that $\Omega[\text{parameters; Const}]=\text{Const}$. Derivative and difference operators have kernels that measure the difference between a value now and a value in the past (with a typical lag of $\tau$). Their kernels have a zero average $\int dt\,\omega(t)=0$, such that $\Omega[\text{parameters;Const}]=0$.

The integral (1) can also be evaluated in scaled time. In this case, the kernel is no more invariant with respect to physical time translation (i.e., it depends on t and t') but it is invariant with respect to translation in business time. If the operator is an average or a derivative, the normalization property is preserved in scaled time.

3.2 Range and Width

The nth moment of a causal kernel $\omega$ is defined as $$\langle t^n\rangle_\omega = \int_0^\infty dt\,\omega(t)t^n. \quad (2)$$

The range r and the width w of an operator $\Omega$ are defined respectively by the following relations $$r[\Omega] = \langle t\rangle_\omega = \int_0^\infty dt\,\omega(t)t, \quad (3)$$
$$w^2[\Omega] = \langle(t-r)^2\rangle_\omega = \int_0^\infty dt\,\omega(t)(t-r)^2.$$

For most operators $\Omega[\tau]$ depending on a time range $\tau$, the formula is set up so that $|r[\Omega[\tau]]|=\tau$.

3.3 Convolution of Kernels

A standard step is to successively apply two linear operators:

$$\Omega_c[z]=\Omega_2 o\Omega_1[z]=\Omega_2\Omega_1 z:=\Omega_2[\Omega_1[z]].$$

It is easy to show that the kernel of $\Omega_c$ is given by the convolution of the kernels of $\Omega 1$ and $\Omega_2$:

$$\omega_c = \omega_1 \star \omega_2 \text{ or } \omega_c(t-t') = \int_{-\infty}^{\infty} dt''\,\omega_1(t-t'')\omega_2(t''-t') \quad (4)$$

or, for causal operators, $$\omega_c(t) = \int_{-t/2}^{t/2} dt'\,\omega_1\left(\frac{t}{2}-t'\right)\omega_2\left(t'+\frac{t}{2}\right) \text{ for } t\geq 0, \quad (5)$$

and $\Omega_c(t)=0$ for $t<0$. Under convolution, range, width, and second moment obey the following simple laws:

$$r_c = r_1 + r_2, \quad (6)$$

$$w_c^2 = w_1^2 + w_2^2,$$

$$\langle t^2 \rangle_c = \langle t^2 \rangle_1 + \langle t^2 \rangle_2 + 2r_1 r_2.$$

3.4 Build-up Time Interval

Since the basic building blocks of a preferred embodiment are EMA operators, most kernels have an exponential tail for large t. This implies that, when starting the evaluation of an operator at time T, a build-up time interval must elapse before the result of the evaluation is "meaningful," (i.e., the initial conditions at T are sufficiently forgotten). This heuristic statement can be expressed by quantitative definitions. We assume that the process z(t) is known since time T, and is modeled before T as an unknown random walk with no drift. The definition (1) for an operator $\Omega$ computed since T needs to be modified in the following way:

$$\Omega[T; z](t) = \int_T^t dt' \omega(t - t') z(t'). \quad (7)$$

The "infinite" build-up corresponds to $\Omega[-\infty; z](t)$. For $-T < 0$, the average build-up error $\epsilon$ at $t=0$ is given by $$\varepsilon^2 = E[(\Omega[-T; z](0) - \Omega[-\infty; z](0))^2] = E\left[\left(\int_{-\infty}^{-T} dt' \omega(-t') z(t')\right)^2\right] \quad (8)$$

where the expectation E[ ] is an average on the space of processes z. For a given build-up error $\epsilon$, this equation is the implicit definition of the build-up time interval T. In order to compute the expectation, we need to specify the considered space of random processes. We assume simple random walks with constant volatility $\sigma$, namely $$E[(z(t) - z(t + \delta t))^2] = \sigma \frac{\delta t}{1y}. \quad (9)$$

The symbol 1y denotes one year, so $\delta t/1y$ is the length of $\delta t$ expressed in years. With this choice of units, $\sigma$ is an annualized volatility, with values roughly from 1% (for bonds) to 50% (for stocks), and a typical value of 10% for foreign exchange. For $t < -T$, $t' < -T$, we have the expectation $$E[z(t)z(t')] = z(-T)^2 + \sigma \min\left(\frac{-t - T}{1y}, \frac{-t' - T}{1y}\right). \quad (10)$$

Having defined the space of processes, a short computation gives $$\varepsilon^2 = z(-T)^2 \left(\int_t^\infty dt \Omega(t)\right)^2 + 2\sigma \int_T^\infty dt \omega(t) \int_T^t dt' \omega(t') \frac{t' - T}{1y}. \quad (11)$$

The first term is the "error at initialization," corresponding to the decay of the initial value $\Omega[-T](-T)=0$ in the definition (7). A better initialization is $\Omega[-T](-T) = z(-T) \int_0^\infty \omega(t)$, corresponding to a modified definition for $\Omega[T](t)$:

$$\Omega[T; z](t) = z(-T) \int_{-\infty}^T dt' \omega(t - t') + \int_T^t dt' \omega(t - t') z(t'). \quad (12)$$

Another interpretation for the above formula is that z is approximated by its most probable value $z(-T)$ for $t < T$. With this better definition for $\Omega$, the error reduces to $$\varepsilon^2 = 2\sigma \int_T^\infty dt \omega(t) \int_T^t dt' \omega(t') \frac{t' - T}{1y}. \quad (13)$$

For a given kernel $\omega$, volatility $\sigma$ and error $\epsilon$, eq. (13) is an equation for T. Most of the kernels introduced in the next section have the scaling form $\omega(\tau, t) = \tilde{\omega}(t/\tau)/\tau$. In this case, the equation for $$\tilde{T} = \frac{T}{\tau}$$

reduces to $$\varepsilon^2 = 2\sigma \frac{\tau}{1y} \int_{\tilde{T}}^\infty dt\, \tilde{\omega}(t) \int_{\tilde{T}}^t dt'\, \tilde{\omega}(t')(t' - \tilde{T}). \quad (14)$$

Since this equation cannot be solved for general operators, the build-up interval should be computed numerically. This equation can be solved analytically for the simple EMA kernel, and gives the solution for the build-up time:

$$\frac{T}{\tau} = -\ln\varepsilon + \frac{1}{2}\ln\left(\frac{\sigma}{2} \frac{\tau}{1y}\right). \quad (15)$$

As expected, the build-up time interval is large for a small error tolerance and for processes with high volatility.

For operators more complicated than the simple EMA, eq. (14) is, in general, not solvable analytically. A simple rule of thumb can be given: the fatter the tail of the kernel, the longer the required build-up. A simple measure for the tail can be constructed from the first two moments of the kernel as defined by eq. (2). The aspect ratio $AR[\Omega]$ is defined as $$AR[\Omega] = \frac{\langle t^2 \rangle_\omega^{1/2}}{\langle t \rangle_\omega} \quad (16)$$

Both $\langle t \rangle$ and $\sqrt{\langle t^2 \rangle}$ measure the extension of the kernel and are usually proportional to $\tau$; thus the aspect ratio is independent of $\tau$ (the "width" of the moving "window" of data over which the EMA is "averaged") and dependent only on the shape of the kernel, in particular its tail property. Typical values of this aspect ratio are $2/\sqrt{3}$ for a rectangular kernel and $\sqrt{2}$ for a simple EMA. A low aspect ratio means that the kernel of the operator has a short tail and therefore a short build-up time interval in terms of $\tau$. This is a good rule for non-negative causal kernels; the aspect ratio is less useful for choosing the build-up interval of causal kernels with more complicated, partially negative shapes.

3.5 Homogeneous Operators

There are many more ways to build non-linear operators; an example is given in Section 4.8 for the (moving) correlation. In practice, most non-linear operators are homogeneous of degree p, namely $\Omega[ax]=|a|^p\Omega[x]$ (here the word "homogeneous" is used in a sense different from that in the term "homogeneous time series"). Translation-invariant homogeneous operators of degree pq take the simple form of a convolution:

$$\Omega[z](t) = \left[\int_{-\infty}^{t} dt'\,\omega(t-t')|z(t')|^p\right]^q \quad (17)$$

for some exponents p and q. An example is the moving norm (see Section 4.4) with ω corresponding to an average and q=1/p.

3.6 Robustness

Data errors (outliers) should be filtered prior to any computation. Outlier filtering is difficult and sometimes arbitrary for high-frequency data in finance; this data is stochastic with a fat-tailed distribution of price changes (see Pictet O. V., Dacorogna M. M., and Müller U. A., Hill, bootstrap and jackknife estimators for heavy tails, in "A practical guide to heavy tails: Statistical Techniques for Analysing Heavy Tailed Distributions," edited by Robert J. Adler, Raisa E. Feldman and Murad S. Taqqu, published by Birkhäuser, Boston 1998) (hereinafter Pictet et al., 1998). Sometimes it is desirable to build robust estimators to reduce the impact of outliers and the choice of the filtering algorithm. The problem is acute mainly when working with returns, for example when estimating a volatility, because the difference operator needed to compute the return r from the price x is sensitive to outliers. The following modified operator achieves robustness by giving a higher weight to the center of the distribution of returns r than to the tails:

$$\Omega[f;r]=f^{-1}\{\Omega[f(r)]\} \quad (18)$$

where $f$ is an odd function over R. Possible mapping functions $f(x)$ are $$\text{sign}(x)|x|^\gamma = x|x|^{\gamma-1}, \quad (19)$$

sign(x) (this corresponds to γ→0 in the above formula), (20)

$$\tan h(x/x_0). \quad (21)$$

Robust operator mapping functions defined by eq. (19) have an exponent $0 \leq \gamma < 1$. In some special applications, operators with γ>1, emphasizing the tail of the distribution, may also be used. In the context of volatility estimates, the usual $L^2$ volatility operator based on squared returns can be made more robust by using the mapping function $f=\text{sign}(x)\sqrt{|x|}$ (the signed square root); the resulting volatility is then based on absolute returns as in eq. (39). More generally, the signed power $f(x)=\text{sign}(x)|x|^p$ transforms an $L^2$ volatility into an $L^{2p}$ volatility. This simple power law transformation is often used and therefore included in the definition of the moving norm, moving variance, or volatility operators, eq. (32). Yet, as will be apparent to those skilled in the art, more general transformations can also be used.

4 The Menagerie of Convolution Operators 4.1 Exponential moving average EMA[τ]

The basic exponential moving average (EMA) is a simple average operator, with an exponentially decaying kernel:

$$ema(t) = \frac{e^{-t/\tau}}{\tau}. \quad (22)$$

This EMA operator is our foundation. Its computation is very efficient, and other more complex operators can be built with it, such as MAs, differentials, derivatives and volatilities. The numerical evaluation is efficient because of the exponential form of the kernel, which leads to a simple iterative formula:

$$EMA[\tau; z](t_n) = \mu\, EMA(\tau; z)(t_{n-1}) + \quad (23)$$

$$(v-\mu)z_{n-1} + (1-v)z_n, \text{ with}$$

$$\alpha = \frac{\tau}{t_n - t_{n-1}},$$

$$\mu = e^{-\alpha},$$

and where v depends on the chosen interpolation scheme, $$v = \begin{cases} 1 & \text{previous point} \\ (1-\mu)/\alpha & \text{linear interpolation} \\ \mu & \text{next point} \end{cases} \quad (24)$$

Thanks to this iterative formula, the convolution never needs to be computed in practice; only a few multiplications and additions have to be done for each tick. In section 4.10, the EMA operator is extended to the case of complex kernels.

4.2 The Iterated EMA [τ, n]

The basic EMA operator can be iterated to provide a family of iterated exponential moving average operators EMA [τ, n]. A simple recursive definition is $$EMA[\tau,n; z]=EMA[\tau; EMA[\tau, n-1; z]] \quad (25)$$

with EMA[τ, 1; z]=EMA [τ, z]. This definition can be efficiently evaluated by using the iterative formula (23) for all these basic EMAs. There is a non-obvious complication related to the choice of the interpolation scheme (24). The EMA of z necessarily has an interpolation scheme different from that used for z. The correct form of EMA [τ; z] between two points is no longer a straight line but a non-linear (exponential) curve. It will be straightforward to those skilled in the art to derive the corresponding exact interpolation formula. When one of the interpolation schemes of eq. (24) is used after the first iteration, a small error is made. Yet, if the kernel is wide as compared to $t_n - t_{n-1}$, this error is indeed very small. As a suitable approximation, a preferred embodiment uses linear interpolation in the second and all further EMA iterations, even if the first iteration was based on the next-point interpolation. The only exception occurs if $z_n$ is not yet known; then we need a causal operator based on the previous-point interpolation.

The kernel of EMA[τ, n] is $$ema[\tau, n](t) = \frac{1}{(n-1)!}\left(\frac{t}{\tau}\right)^{n-1}\frac{e^{-t/\tau}}{\tau}. \quad (26)$$

This family of functions is related to Laguerre polynomials, which are orthogonal with respect to the measure $e^{-t}$ (for τ=1). Through an expansion in Laguerre polynomials, any kernel can be expressed as a sum of iterated EMA kernels. Therefore, the convolution with an arbitrary kernel can be evaluated by iterated exponential moving averages. Yet, the convergence of this expansion may be slow, namely high-order iterated EMAs may be necessary, possibly with very large coefficients. This typically happens if one tries to construct operators that have a decay other (faster) than exponential. Therefore, in practice, we construct operators "empirically" from a few low-order EMAs, in a way to minimize the build-up time. The set of operators provided by this description covers a wide range of computations needed in finance.

The range, second moment, width, and aspect ratio of the iterated EMA are, respectively, $$r = n\tau, \quad (27)$$
$$\langle t^2 \rangle = n(n+1)\tau^2,$$
$$w^2 = n\tau^2,$$
$$AR = \sqrt{(n+1)n}\,.$$

The iterated EMA[τ, n] operators with large n have a shorter, more compact kernel and require a shorter build-up time interval than a simple EMA of the same range nτ. This is indicated by the fact that the aspect ratio AR decreases toward 1 for large n. Each basic EMA operator that is part of the iterated EMA has a range τ which is much shorter than the range nτ of the full kernel. Even if the tail of the kernel is still exponential, it decays faster due to the small basic EMA range τ.

In order to further improve our preferred method, we build another type of compact kernel by combining iterated EMAs, as shown in the next section. As the iterated EMAs, these combined iterated EMAs have a shorter build-up time interval than a simple EMA of the same range.

4.3 Moving Average MA[τ, n]

A very convenient moving average operator is provided by $$MA[\tau, n] = \frac{1}{n}\sum_{k=1}^{n} EMA[\tau', k], \text{ with } \tau' = \frac{2\tau}{n+1}. \quad (28)$$

Figure 2:
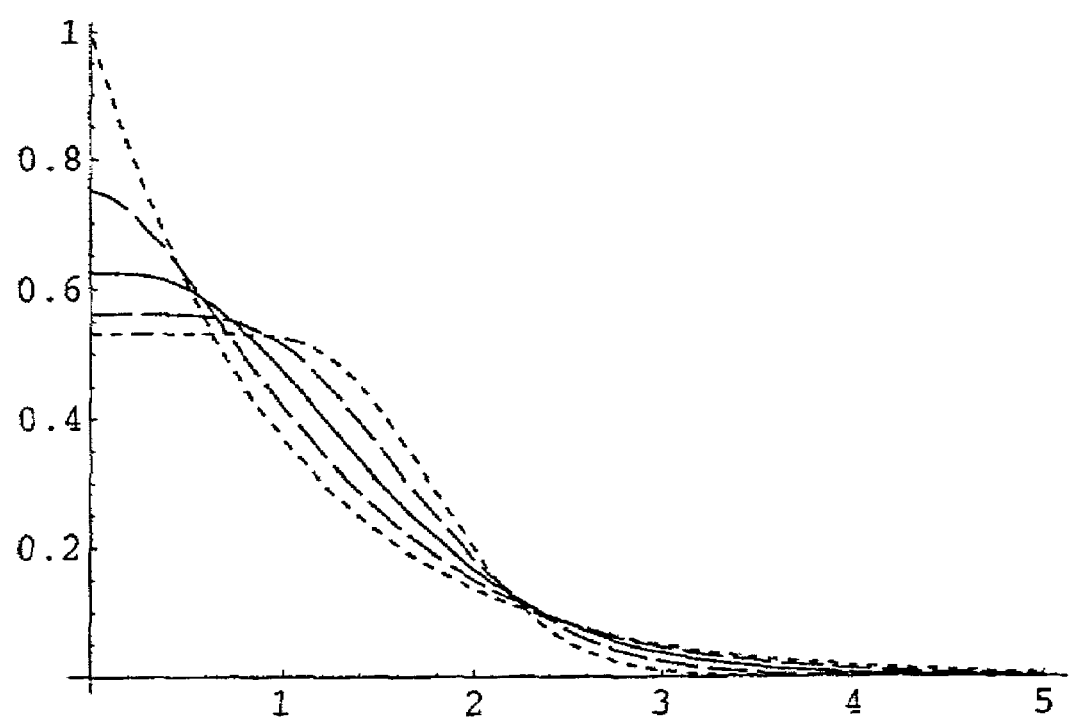
FIG. 2 is a graph of a kernel ma[τ, n](t) for n=1, 2, 4, 8, and 16, where τ=1.

The parameter τ' is chosen so that the range of MA[τ, n] is r=τ, independent of n. This provides a family of more rectangular-shaped kernels, with the relative weight of the distant past controlled by n. Kernels for different values of n and τ=1 are shown in FIG. 2, where ma[τ,n](t)is plotted for n=1, 2, 4, 8, and 16, with τ=1. The kernels' analytical form is given by $$ma[\tau, n](t) = \frac{n+1}{n}\frac{e^{-t/\tau'}}{2\tau}\sum_{k=0}^{n-1}\frac{1}{k!}\left(\frac{t}{\tau'}\right)^{k}. \quad (29)$$

For n=∞, the sum corresponds to the Taylor expansion of exp(t/τ'), which cancels the term exp (−t/τ') in (29), making the kernel constant. For finite n, when t/τ' is small enough, the finite sum will be a very good approximation of exp (−t/τ'). "Small enough" means that the largest term in the sum is of order one: (t/τ')$^n$/n!~1. For large n, the condition (t/τ')n/n!~1 corresponds to t~2τ (using Stirling's approximation n!~n$^n$). Therefore, for t<<2τ, the series approximates well the Taylor expansion of an exponential:

$$\sum_{k=0}^{n-1}\frac{1}{k!}\left(\frac{t}{\tau'}\right)^{k} \to e^{t/\tau'}, ma \to \frac{n+1}{n}\frac{1}{2\tau}.$$

Figure 3:
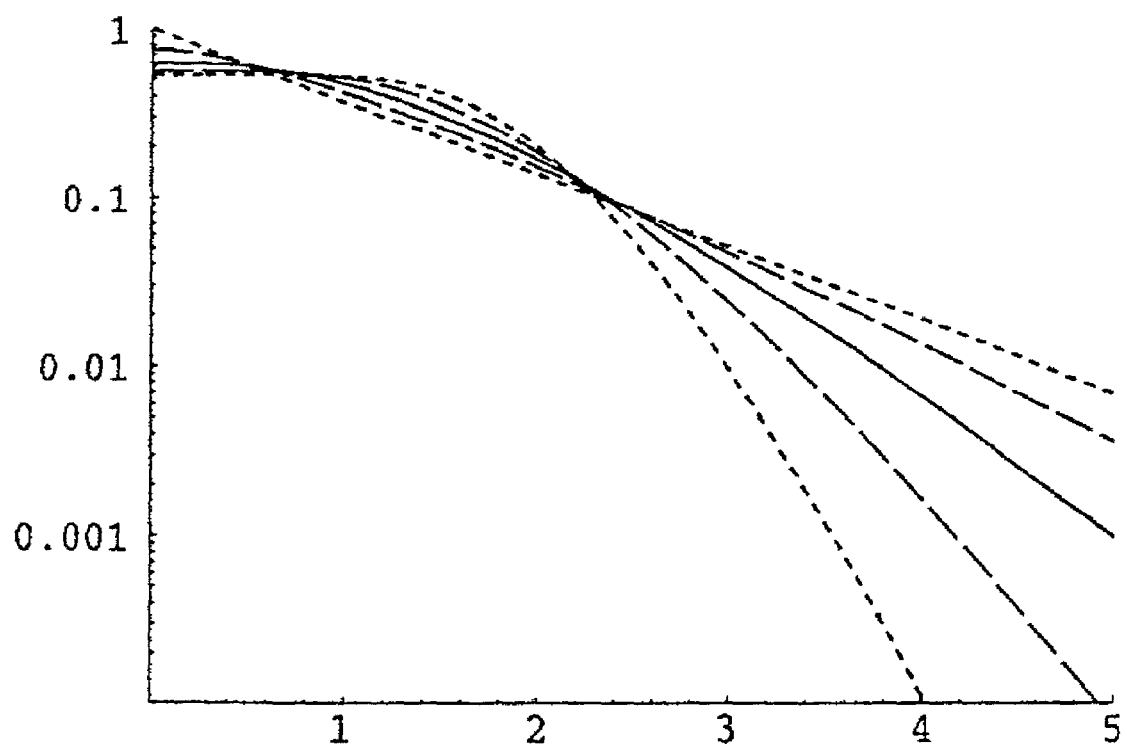
FIG. 3 is a graph on a logarithmic scale of the kernel ma[τ, n](t) for n=1, 2, 4, 8, and 16, where τ=1.

This explains the constant behavior of the kernel for t<<2τ. For t>2τ large, the exponential always dominates and the kernel decays to zero. Therefore, for large n, this operator tends to a rectangular moving average for which AR=2/√3. For values of n≧5, the kernel is rectangular-like more than EMA-like; this can as seen in FIG. 2. The decay of MA kernels is shown in FIG. 3, where ma[τ, n](t) is plotted on a logarithmic scale, for n=1, 2, 4, 8, and 16, with τ=1. The aspect ratio of the MA operator is $$AR = \sqrt{\frac{4(n+2)}{3(n+1)}}\,. \quad (30)$$

Clearly, the larger n, the shorter the build-up.

This family of operators can be extended by "peeling off" some EMAs with small k:

$$MA[\tau, n_{inf}, n_{sup}] = \frac{1}{n_{sup}-n_{inf}+1}\sum_{k=n_{inf}}^{n_{sup}} EMA[\tau', k] \text{ with } \tau' = \frac{2\tau}{n_{sup}+n_{inf}}$$

and with $1 \leq n_{inf} \leq n_{sup}$. By choosing such a modified MA with $n_{inf} > 1$, we can generate a lag operator with a kernel whose rectangular-like form starts after a lag rather than immediately. This is useful in many applications that will be clear to those skilled in the art.

In almost every case, a moving average operator can be used instead of a sample average. The sample average of z(t) is defined by $$E[z] = \frac{1}{t_e - t_s}\int_{t_s}^{t_e} dt'\, z(t') \quad (31)$$

where the dependency on start-time $t_s$ and end-time $t_e$ is implicit on the left-hand side. This dependency can be made explicit with the notation $E[t_e - t_s; Z](t_e)$, thus demonstrating the parallelism between the sample average and a moving average MA[2τ; z](t). The conceptual difference is that when using a sample average, $t_s$ and $t_e$ are fixed, and the sample average is a functional from the space of time series to R, whereas the MA operator produces another time series. Keeping this difference in mind, we can replace the sample average Et[·] by a moving average MA[·]. For example, we can construct a standardized time series z (as defined in Section 2), a moving skewness, or a moving correlation (see the various definitions below). Yet, sample averages and MAs can behave differently: for example, $E[(z-E[z]^2]=E[z^2]-E[z]^2$, whereas MA $[(z-MA [z])^2] \neq MA [z^2]-MA [z]^2$.

4.4 Moving Norm, Variance and Standard Deviation

With the efficient moving average operator, we define the moving norm, moving variance, and moving standard deviation operators, respectively:

$$MNorm[\tau, p; z]=MA[\tau; |z|^p]^{1/p},$$

$$MVar[\tau, p; z]=MA[\tau;|z-MA[\tau, z]|^p],$$

$$MSD[\tau, p; z]=MA[\tau;|z-MA[\tau; z]|^p]^{1/p}. \quad (32)$$

The norm and standard deviation are homogeneous of degree one with respect to z. The p-moment $\mu_p$ is related to the norm by $\mu_p=MA [|z|^p=MNORM[z]^p$. Usually, p=2 is taken. Lower values for p provide a more robust estimate (see Section 3.6), and p=1 is another common choice. Even lower values can be used, for example p=½. In the formulae for MVar and MSD, there are two MA operators with the same range τ and the same kernel. This choice is in line with standard practice: empirical means and variances are computed for the same sample. Other choices can be interesting—for example, the sample menu can be estimated with a longer time range.

4.5 Differential Δ[τ]

Figure 4:
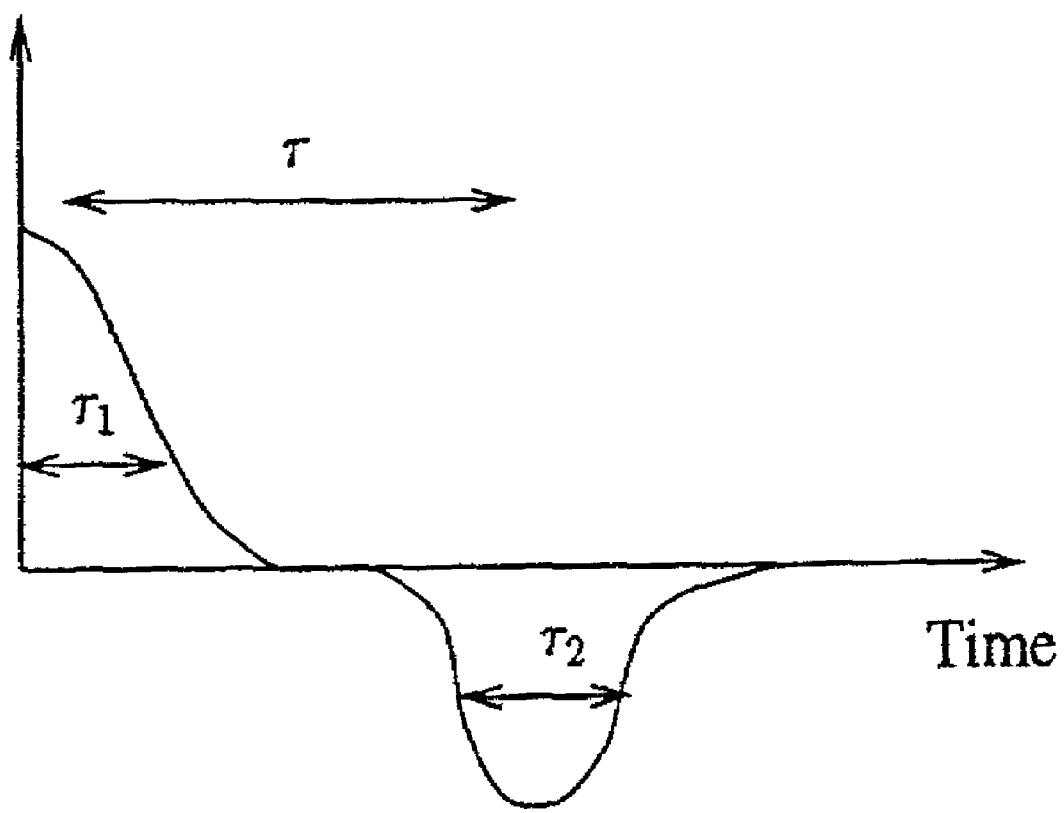
FIG. 4 is a graph of a schematic differential kernel.

As mentioned above, a low-noise differential operator suitable to stochastic processes should compute an "average differential," namely, the difference between an average around time "now" over a time interval $\tau_1$ and an average around time "now−τ" on a time interval $\tau_2$. The kernel may look like the schematic differential kernel plotted in FIG. 4.

Usually, τ, $\tau_1$, and $\tau_2$ are related and only the τ parameter appears, with $\tau_1 \sim \tau_2 \sim \tau/2$. The normalization for Δ is chosen so that Δ[τ; c]=0 for a constant function c=c(t)=constant, and Δ[τ; t]=τ. Note that our point of view is different from that used in continuous-time stochastic analysis. In continuous time, the limit τ→0 is taken, leading to the Ito derivative with its subtleties. In our case, we keep the range τ finite in order to be able to analyze a process at different time scales (i.e., for different orders of magnitudes of τ). Moreover, for financial data, the limit τ→0 cannot be taken because a process is known only on a discrete set of time points (and probably does not exist in continuous time).

Figure 5:
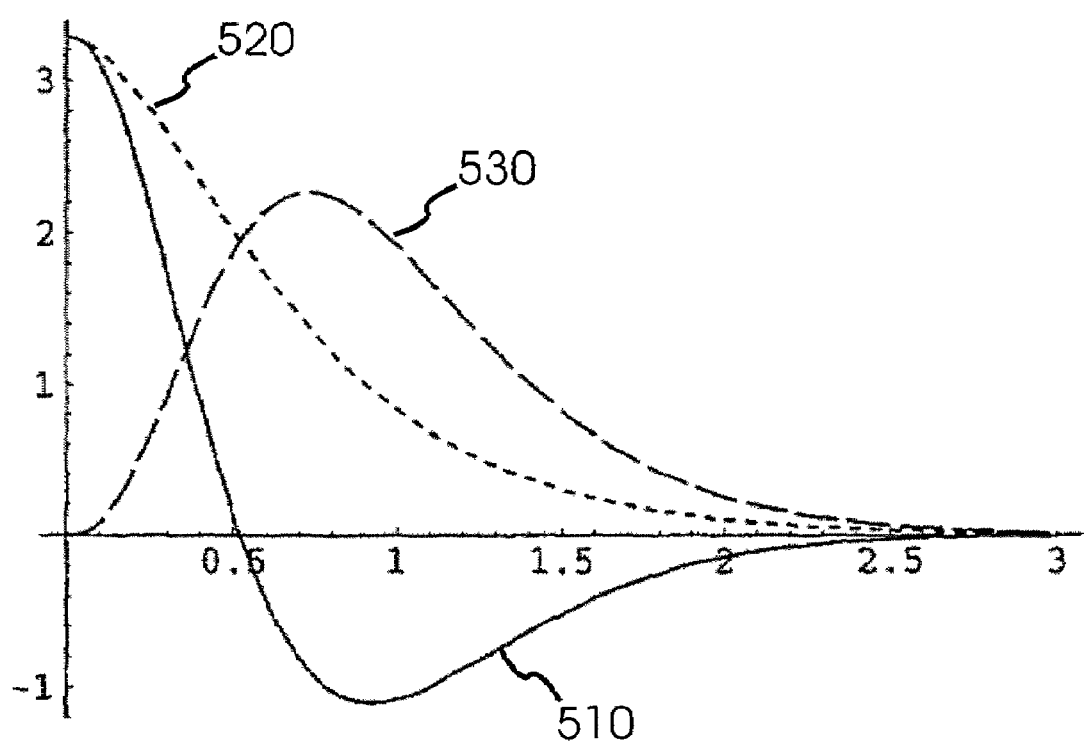
FIG. 5 is a graph of a differential operator Δ[τ], for τ=1.

The following operator can be selected as a suitable differential operator:

$$\Delta[\tau]=\gamma(EMA[\alpha\tau, 1]+EMA[\alpha\tau, 2]-2EMA[\alpha\beta\tau, 4]) \quad (33)$$

with γ=1.22208, β=0.65 and $\alpha^{-1}=\gamma(8\beta-3)$. This operator has a well-behaved kernel that is plotted in FIG. 5, wherein the full line 510 is the graph of the kernel of the differential operator Δ[τ], for τ=1; the dotted curve 520 corresponds to the first two terms γ(EMA[Δτ, 1]+EMA[ατ, 2]); and the dashed curve 530 corresponds to the last term 2γEMA[αβτ, 4]. The value of γ is fixed so that the integral of the kernel from the origin to the first zero is one. The value of α is fixed by the normalization condition and the value of β is chosen in order to get a short tail.

Figure 6:
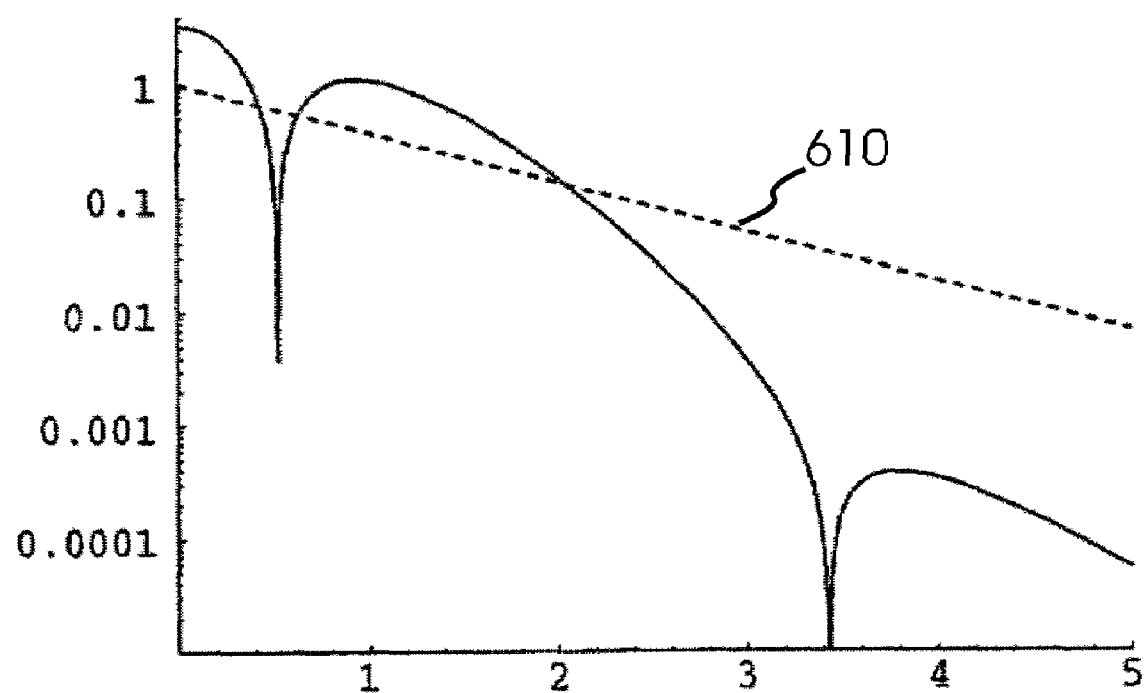
FIG. 6 is a graph on a logarithmic scale of the absolute value of the differential operator Δ[τ], for τ=1.

The tail can be seen in FIG. 6, which shows the kernel of the differential operator Δ[τ], plotted in a logarithmic scale. The dotted line 610 shows a simple EMA with range τ, demonstrating the much faster decay of the differential kernel. After t=3.25τ, the kernel is smaller than $10^{-3}$, which translates into a small required build-up time of about 4τ.

Figure 7:
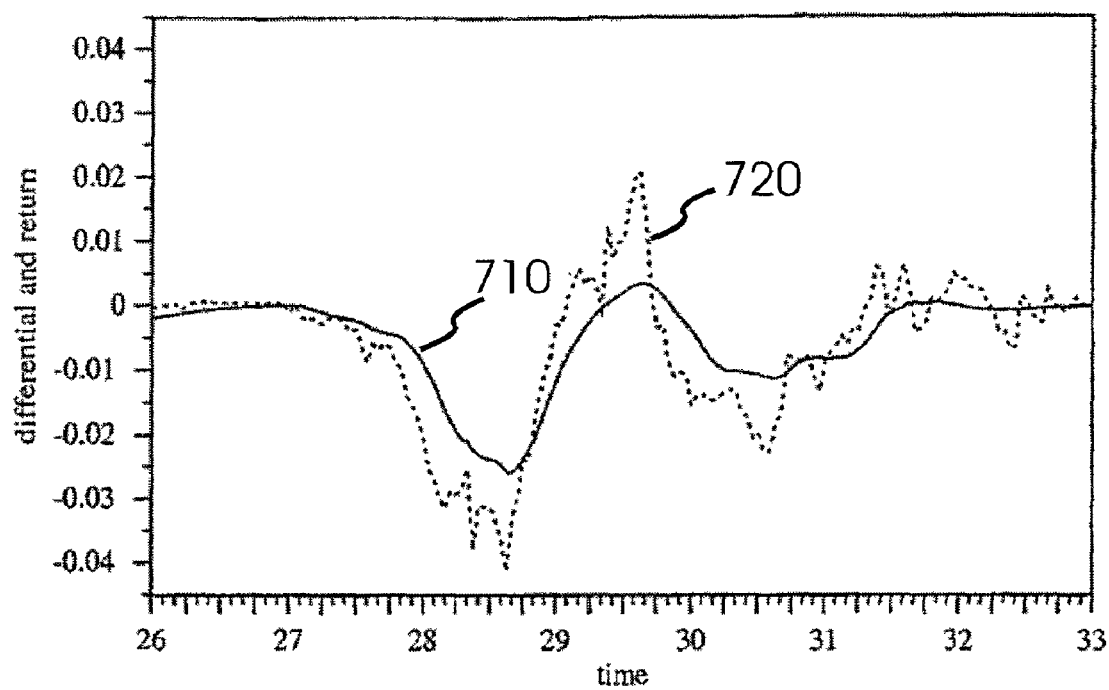
FIG. 7 illustrates a comparison between the differential computed using the formula $$\Delta[\tau] = \gamma \ (EMA[\alpha\tau, 1] + EMA[\alpha\tau, 2] - 2 \ EMA[\alpha\beta\tau, 4]),$$

In finance, the main purpose of a Δ operator is computing returns of a time series of (logarithmic) prices x with a given time interval τ. Returns are normally defined as changes of x over τ; the alternative return definition r[τ]=Δ[τ; x] is used herein. This computation requires the evaluation of 6 EMAs and is therefore efficient, time-wise and memory-wise. An example using our "standard week" is plotted in FIG. 7, demonstrating the low noise level of the differential. FIG. 7 illustrates a comparison between the differential computed using the formula (33) with τ=24 hours ("24 h") (the solid line 710), and the point-wise return x(t)−x(t−24 h) (the dotted line 720). The time lag of approximately 4 hours between the curves is essentially due to the extent of both the positive part of the kernel (0<t<0.5) and the tail of the negative part (t>1.5).

The conventionally computed return r[−τ](t)=x(t)−x(t−τ) is very inefficient to evaluate for inhomogeneous time series. The computation of x(t−τ) requires many old $t_i$, $x_i$ values to be kept in memory, and the $t_i$ interval bracketing the time t−τ has to be searched for. Moreover, the number of ticks to be kept in memory is not bounded. This return definition corresponds to a differential operator kernel made of two δ functions (or to the limit $\tau_1$, $\tau_2 \to 0$ of the kernel in FIG. 4). The quantity x(t)−x(t−τ) can be quite noisy, so a further EMA might be taken to smooth it. In this case, the resulting effective differential operator kernel has two discontinuities, at 0 and at τ, and decays exponentially (much slower than the kernel of Δ[τ;x]). Thus it is cleaner and more efficient to compute returns with the Δ operator of eq. (33).

Another quantity commonly used in finance is x−EMA[τ; x], often called a momentum or an oscillator. This is also a differential with the kernel δ(t)−exp(−t/τ)τ, with a δ function at t=0. A simple drawing shows that the kernel of eq. (33) produces a much less noisy differential. Other appropriate kernels can be designed, depending on the application. In general, there is a trade-off between the averaging property of the kernel and a short response to shocks of the original time series.

4.6 Derivative D[τ] and γ-Derivative D[τ,γ]

The derivative operator $$D[\tau] = \frac{\Delta[\tau]}{\tau} \quad (34)$$

behaves exactly as the differential operator Δ[τ], except for the normalization D[τ; t]=1. This derivative can be iterated in order to construct higher order derivatives:

$$D^2[\tau]=D[\tau; D[\tau]]. \quad (35)$$

The range of the second-order derivative operator $D^2$ is 2τ. More generally, the n-th order derivative operator $D^n$, constructed by iterating the derivative operator n times, has a range nτ. As defined, the derivative operator has the dimension of an inverse time. It is easier to work with dimensionless operators, and this is done by measuring τ in some units. One year provides a convenient unit, corresponding to an annualized return when D[τ]x is computed. The choice of unit is denoted by τ/1y, meaning that τ is measured in years; other units could be taken as well.

For a random diffusion process, a more meaningful normalization for the derivative is to take $D[\tau]=\Delta[\tau]/\sqrt{\tau/1y}$. For a space of processes as in Section 3.4, such that eq. (9) holds, the basic scaling behavior with τ is eliminated, namely E[(D [τ]z)$^2$]=σ$^2$. More generally, we can define a γ-derivative as $$D[\tau, \gamma] = \frac{\Delta[\tau]}{(\tau/1y)^\gamma}. \quad (36)$$

In a preferred embodiment, we use

γ=0 differential,

γ=0.5 stochastic diffusion process,

γ=1 the usual derivative. (37)

An empirical probability density function for the derivative is displayed in FIG. 8, which plots the annualized derivative D[τ, γ=0.5; x] for USD/CHF from 1 Jan. 1988 to 1 Nov. 1998. The shorter time intervals τ correspond to the most leptocurtic curves. In order to discard the daily and weekly seasonality, the computations are done on the business θ-time scale according to (Dacorogna et al., 1993). The data was sampled every 2 hours in θ-time to construct the curves. The Gaussian pdf, added for comparison, has a standard deviation of σ=0.07, similar to that of the other curves. The main part of the scaling with τ is removed when the γ-derivative with γ=0.5 is used.

4.7 Volatility

Volatility is a measure widely used for random processes, quantifying the size and intensity of movements, namely the "width" of the probability distribution P(Δz) of the process increment ΔZ, where Δ is a difference operator yet to be chosen. Often the volatility of market prices is computed, but volatility is a general operator that can be applied to any time series. There are many ways to turn this idea into a definition, and there is no unique, universally accepted definition of volatility in finance. The most common computation is the volatility of daily prices, Volatility [x], evaluated for a regular time series in business time, with a point-wise price difference $r_i$=$\Delta x_i$=$x(t_i)$−$x(t_i$−τ') and τ'=1 day. The time horizon τ' of the return is one parameter of the volatility; a second parameter is the length τ of the moving sample used to compute the "width." The most common definition for the width estimator uses an L$^2$ norm:

$$\text{Volatility}[\tau, \tau'; z] = \left(\frac{1}{n}\sum_{i=0}^{n-1} (\delta RTS[\tau'; z])_i^2\right)^{1/2}, \text{ with } \tau = n\tau', \quad (38)$$

where RTS[τ'; z] is an artificial regular time series, spaced by τ', constructed from the irregular time series z (see Section 5.3). The operator δ computes the difference between successive values (see Section 5.4).

The above definition suffers from several drawbacks. First, for inhomogeneous time series, a synthetic regular time series must be created, which involves an interpolation scheme. Second, the difference is computed with a point-wise difference. This implies some noise in the case of stochastic data. Third, only some values at regular time points are used. Information from other points of the series, between the regular sampling points, is thrown away. Because of this information loss, the estimator is less accurate than it could be. Fourth, it is based on a rectangular weighting kernel (all points have constant weights of either 1/n or 0 as soon as they are excluded from the sample). A continuous kernel with declining weights leads to a better, less disruptive, and less noisy behavior. Finally, by squaring the returns, this definition puts a large weight on large changes of z and therefore increases the impact of outliers and the tails of P(z). Also, as the fourth moment of the probability distribution of the returns might not exist (see Müller U. A., Dacorogna M. M., and Pictet O. V., *Heavy tails in high-frequency financial data*, in "A practical guide to heavy tails: Statistical Techniques for Analysing Heavy Tailed Distributions," edited by Robert J. Adler, Raisa E. Feldman and Murad S. Taqqu, published by Birkhäuser, Boston 1998) (hereinafter Müller et al., 1998), the volatility of the volatility might not exist either. In other words, this estimator is not very robust. There are thus several reasons to prefer a volatility defined as an L$^1$ norm:

$$\text{Volatility}[\tau, \tau'; z] = \frac{1}{N}\sum_{i=0}^{N-1} |\Delta[RTS[\tau'; z]]_i|, \text{ with } \tau = N\tau'. \quad (39)$$

There are again many ways to introduce a better definition for inhomogeneous time series. These definitions are variations of the following one, used in a preferred embodiment:

Volatility [τ, τ', p; z]=MNorm[τ/2, p; Δ[τ'; z]] (40)

where the moving norm MNorm is defined by eq. (32) and the differential operator Δ of eq. (33) is used. Let us emphasize that a homogeneous time series is not needed, and that this definition can be computed simply and efficiently for high-frequency data because it ultimately involves only EMAs. Note the division by 2 in the MNorm of range τ/2. This is to attain an equivalent of the definition (38) which is parametrized by the total size rather than the range of the (rectangular) kernel.

The variations of definition (40) used in alternate embodiments include, first, replacing the norm MNorm by a moving standard deviation MSD, as defined by eq. (32). This modification subtracts the empirical sample mean from all observations of Δ[τ'; z]. This is not standard for volatility computations of prices in finance, but might be a better choice for other time series or applications. Empirically, for most data in finance (e.g., FX data), the numerical difference between taking MNorm and MSD is very small. The second variation is replacing the differential Δ by a γ-derivative D[τ, γ]. The advantage of using the gamma derivative is to remove the leading τ dependence (for example, by directly computing the annualized volatility, independently of τ). An example is given by FIG. 9, which shows the annualized volatility computed as MNorm [τ/2; D [τ/32, γ=0.5; x]] with τ=1 h. The norm is computed with p=2 and n=8. The plotted volatility has 5 main maxima corresponding to the 5 working days of the example week. The Tuesday maximum 910 is higher than the others, due to the stock crash mentioned above.

Let us emphasize that the volatility definition (38) depends on the two time ranges τ and τ' and, to be unambiguous, both time intervals must be given. Yet, for example when talking about a daily volatility, the common terminology is rather ambiguous because only one time interval is specified. Usually, the emphasis is put on τ'. A daily volatility, for example, measures the average size of daily price changes, i.e., τ'=1 day. The averaging time range τ is chosen as a multiple of τ', of the order τ≧τ' up to τ=1000 τ' or more. Larger multiples lead to lower stochastic errors as they average over large samples, but they are less local and dampen the possible time variations of the volatility. From empirical studies, one can conclude that good compromises are in the range from $\tau=16\tau'$ to $\tau=32\tau'$.

On other occasions, for example in risk management, one is interested in the conditional daily volatility. Given the prices up to today, we want to produce an estimate or forecast for the size of the price move from today to tomorrow (i.e., the volatility within a small sample of only one day). The actual value of this volatility can be measured one day later; it has $\tau=1$ day by definition. In order to measure this value with an acceptable precision, we may choose a distinctly smaller $\tau'$, perhaps $\tau'=1$ hour. Clearly, when only one time parameter is given, there is no simple convention to remove the ambiguity.

4.8 Standardized Time Series $\hat{z}$, Moving Skewness and Kurtosis

From a time series z, we can derive a moving standardized time series $$\hat{z}[\tau] = \frac{z - MA[\tau; z]}{MSD[\tau; z]}. \quad (41)$$

In finance, z typically stands for a time series of returns rather than prices.

Once a standardized time series $\hat{z}[\tau]$ has been defined, the definitions for the moving skewness and the moving kurtosis are straightforward:

$$MSkewness[\tau_1, \tau_2; z] = MA[\tau_1; \hat{z}[\tau_2]^3], \quad (42)$$

$$MKurtosis[\tau_1, \tau_2; z] = MA[\tau_1; \hat{z}[\tau_2]^4].$$

The three quantities for our sample week are displayed in FIG. 10, which shows plots of the standardized return 1020, moving skewness 1040, and moving kurtosis 1060. The returns are computed as $r=D[\tau=15$ minutes$; x]$ and standardized with $\tau_1=\tau_2=24$ h.

4.9 Moving Correlation

Several definitions of a moving correlation can be constructed for inhomogeneous time series. Generalizing from the statistics textbook definition, we can write two simple definitions:

$$MCorrelation_1[\tau; y, z]=MA[(y-MA[y])(z-MA[z])]/(MSD[y]MSD[z]). \quad (43)$$

$$MCorrelation_2[\tau; y, z] = MA\left[\frac{(y - MA[y])(z - MA[z])}{MSD[y]MSD[z]}\right] \quad (44)$$

$$= MA[\hat{y}\hat{z}],$$

where all the MA and MSD operators on the right hand sides are taken with the same decay constant $\tau$. These definitions are not equivalent because the MSD operators in the denominator are time series that do not commute with the MA operators. Yet both definitions have their respective advantages. The first definition obeys the inequality $-1 \leq MCorrelation_1 \leq 1$. This can be proven by noting that $MA[z^2](t)$ for a given t provides a norm on the space of (finite) time series up to t. This happens because the MA operator has a strictly positive kernel that acts as a metric on the space of time series.

In this space, the triangle inequality holds: $\sqrt{MA[(y+z)^2]} \leq \sqrt{MA[y^2]} + \sqrt{MA[z^2]}$, and, by a standard argument, the inequality on the correlation follows. With the second definition (44), the correlation matrix is bilinear for the standardized time series. Therefore, the rotation that diagonalizes the correlation matrix acts linearly in the space of standardized time series. This property is necessary for multivariate analysis, when a principal component decomposition is used.

In risk management, the correlation of two time series of returns, x and y, is usually computed without subtracting the sample means of x and y. This implies a variation of eqs. (43) and (44):

$$MCorrelation_1'[\tau; y, z]=MA[(y z)/(MNorm[y]MNorm[z])], \quad (45)$$

$$MCorrelation_2'[\tau; y, z] = MA\left[\frac{yz}{(MNorm[y]MNorm[z])}\right] \quad (46)$$

where again the same $\tau$ is chosen for all MA operators.

In general, any reasonable definition of a moving correlation must obey $$\lim_{\tau \to \infty} MCorrelation[\tau; y, z] \to \rho[y,z] \quad (47)$$

where $\rho[y, z]$ is the theoretical correlation of the two stationary processes x and y. Generalizing the definition (44), the requirements for the correlation kernel are to construct a causal, time translation invariant, and a linear operator for $\hat{y}$ and $\hat{z}$. This leads to the most general representation $$MCorrelation[\hat{y}, \hat{z}](t) = \int_0^\infty \int_0^\infty dt' dt'' c(t', t'') \hat{y}(t-t') \hat{z}(t-t''). \quad (48)$$

We also require symmetry between the arguments: MCorrelation$[\hat{z}, \hat{y}]$=MCorrelation$[\hat{y}, \hat{z}]$. Moreover, the correlation must be a generalized average, namely MCorrelation[Const, Const']=ConstConst', or for the kernel $$\int\int_0^\infty dt' dt'' c(t', t'') = 1.$$

There is a large selection of possible kernels that obey the above requirements. For example, eq. (44) is equivalent to the kernel $$c(t', t'') = \delta(t' - t'') ma\frac{(t' + t'')}{2},$$

but other choices might be better than this one.

4.10 Windowed Fourier Transform

In order to study a time series and its volatility at different time scales, we want to have a method similar to wavelet transform methods, yet adapted to certain frequencies. As with wavelet transforms, a double representation in time and frequency is needed, but an invertible transformation is not needed here because our aim is to analyze rather than further process the signal. This gives us more flexibility in the choice of the transformations.

A single causal kernel with the desired properties is or is similar to $ma[\tau](t) \sin(kt/\tau)$. Essentially, the sine part is (locally) analyzing the signal at a frequency $k/\tau$ and the ma part is taking a causal window of range $\tau$. In order to obtain a couple of oscillations in the window $2\tau$, choose k between $k \sim \pi$ and $k \sim 5\pi$. Larger k values increase the frequency resolution at the cost of the time resolution. The basic idea is to compute an EMA with a complex $\tau$; this is equivalent to including a sine and cosine part in the kernel. The advantageous computational iterative property of the moving average is preserved.

The first step is to use complex iterated EMAs. The kernel of the complex ema is defined as $$ema[\zeta](t) = \frac{e^{-\zeta t}}{\tau}, \text{ where } \zeta = \frac{1}{\tau}(1 + ik), \quad (49)$$

and where $\xi$ is complex ($\xi \in C$) but $\tau$ is again a real number. The choice of the normalization factor $1/\tau$ is somewhat arbitrary (a factor $|\xi|$ will produce the same normalization for the real case k=0) but leads to a convenient definition of the windowed Fourier kernel below. By using the convolution formula, one can prove iteratively that the kernel of the complex EMA[$\xi$, n] is given by $$ema[\zeta, n](t) = \frac{1}{(n-1)!}\left(\frac{t}{\tau}\right)^{n-1}\frac{e^{-\zeta t}}{\tau}, \quad (50)$$

which is analogous to eq. (26). The normalization is such that, for a constant function c(t)=c, $$EMA[\zeta, n; c] = \frac{c}{(1 + ik)^n}. \quad (51)$$

Using techniques similar to those applied to eq. (23), we obtain an iterative computational formula for the complex EMA:

$$EMA[\zeta; z](t_n) = \mu \; EMA[\zeta; z](t_{n-1}) + z_{n-1}v - \frac{\mu}{1+ik} + z_n 1 - \frac{v}{1+ik}, \text{ with} \quad (52)$$

$$\alpha = \zeta(t_n - t_{n-1})$$

$$\mu = e^{-\alpha}$$

where v depends on the chosen interpolation scheme as given by eq. (24).

We define the (complex) kernel wf(t) of the windowed Fourier transform WF as $$wf[\tau, k, n](t) = ma[\tau, n](t)e^{ikt/\tau} \quad (53)$$

$$= \frac{1}{n}\sum_{j=1}^{n}\frac{1}{(j-1)!}\left(\frac{t}{\tau}\right)^{j-1}\frac{e^{-\zeta t}}{\tau}$$

-continued $$= \frac{1}{n}\sum_{j=1}^{n} ema[\zeta, j](t).$$

FIG. 11 plots the kernel wf(t) for the windowed Fourier operator WF, for n=8 and k=6. Three aspects of the complex kernel are shown: (1) the envelope 1120 (=absolute value), (2) the real part 1140 (starting on top), and (3) the imaginary part 1160 (starting at zero). Another appropriate name for this operator might be CMA for Complex Moving Average. The normalization is such that, for a constant function c(t)=c, $$N_{WF} = WF[\zeta, n; c] = \frac{c}{n}\sum_{j=1}^{n}\frac{1}{(1+ik)^j}.$$

In order to provide a more convenient real quantity, with the mean of the signal subtracted, we can define a (non-linear) normed windowed Fourier transform as NormedWF[$\xi$,n; z]=|WF[$\xi$, n; z]-$N_{WF}$MA[$\tau$,n; z]| (54)

The normalization is chosen so that

NormaedWF[$\xi$, n; c]=0

Note that in eq. (54) we are only interested in the amplitude of the measured frequency; by taking the absolute value we have lost information on the phase of the oscillations.

FIG. 12 shows an example of the normed windowed Fourier transform for the example week, wherein the normed windowed Fourier transform is plotted, with $\tau$=1 hour, k=6, and n=8. The stock market crash is again nicely spotted as the peak 1220 on Tuesday 28.

Using the described methods, other quantities of interest can be easily calculated. For example, we can compute the relative share of a certain frequency in the total volatility. This would mean a volatility correction of the normed windowed Fourier transform. A way to achieve this is to divide NormedWF by a suitable volatility, or to replace z by the standardized time series $\hat{z}$ in eq. (54).

5 Implementation

In a preferred embodiment, the techniques described above are implemented in a method used to obtain predictive information for inhomogeneous financial time series. Major steps of the method (see FIG. 13) comprise the following: At step 1310 financial market transaction data is electronically received by a computer over an electronic network. At step 1320 the received financial market transaction data is electronically stored in a computer-readable medium accessible to the computer (e.g., on a hard drive, in RAM, or on an optical storage disk). At step 1330 a time series z is constructed that models the received financial market transaction data. At step 1340 an exponential moving average operator is constructed, and at step 1350 an iterated exponential moving average operator is constructed that is based on the exponential moving operator constructed in step 1340. At step 1360, a time-translation-invariant, causal operator $\Omega[z]$ is constructed that is based on the iterated exponential moving average operator constructed in step 1350. $\Omega[z]$ is a convolution operator with kernel $\omega$ and time range $\tau$. (It is important to note, with respect to the steps described herein, that no particular order, other than that order required to make the method practical, should be inferred from the fact that the steps are described and labeled in a certain order; the order has been chosen merely for ease of explication.) At step 1370 values of one or more predictive factors relating to said time series z are calculated by the computer. The predictive factors are defined in terms of the convolution operator Ω[z]. At step 1380 the values of one or more predictive factors calculated by the computer are stored in a computer readable medium (not necessarily the same medium as in step 1320).

Various predictive factors have been described above, and specifically comprise return, momentum, and volatility. Other predictive factors will be apparent to those skilled in the art.

In a second preferred embodiment, the major steps of the method differ from those described in connection with FIG. 13. This second preferred embodiment is illustrated in FIG. 14. Major steps of the method comprise the following: At step 1410 financial market transaction data is electronically received by a computer over an electronic network. At step 1420 the received financial market transaction data is electronically stored in a computer-readable medium accessible to the computer. At step 1430 a time series z is constructed that models the received financial market transaction data. At step 1440 an exponential moving operator is constructed, and at step 1450, an iterated exponential moving operator is constructed that is based on the exponential moving operator constructed in step 1440. At step 1460, a time-translation-invariant, causal operator Ω[z] is constructed that is based on the iterated exponential moving average operator constructed in step 1450. Ω[z] is a convolution operator with kernel ω and time range τ. At step 1470 a standardized time series ẑ is constructed (see Section 4.8). At step 1480 values of one or more predictive factors relating to said time series z are calculated by the computer. The predictive factors in this case are defined in terms of the standardized time series ẑ. At step 1490 the values of one or more predictive factors calculated by the computer are stored in a computer readable medium (not necessarily the same medium as in step 1420). In addition to the predictive factors mentioned above, additional predictive factors relevant to this method are moving skewness and moving kurtosis.

In a third preferred embodiment, the major steps are similar to those described above, but differ enough to call for separate explanation. In this embodiment, illustrated in FIG. 15, the steps are as follows: At step 1510 financial market transaction data is electronically received by a computer over an electronic network. At step 1520 the received financial market transaction data is electronically stored in a computer-readable medium accessible to the computer. At step 1530 a time series z is constructed that models the received financial market transaction data. At step 1540 an exponential moving average operator is constructed, and at step 1550 an iterated exponential moving average operator is constructed that is based on the exponential moving operator constructed in step 1540. At step 1555, a time-translation-invariant, causal operator Ω[z] is constructed that is based on the iterated exponential moving average operator constructed in step 1550. Ω[z] is a convolution operator with kernel ω and time range τ. At step 1550 an exponential moving average operator EMA[τ; z] is constructed, and at step 1560 a moving average operator MA is constructed. MA depends on EMA (see Section 4.3). At step 1565 a moving standard deviation operator MSD is constructed. MSD depends on MA (see Section 4.4). At step 1570 values of one or more predictive factors relating to said time series z are calculated by the computer. The predictive factors are defined in terms of one or more of EMA, MA, and MSD. At step 1580 the values of one or more predictive factors calculated by the computer are stored in a computer readable medium (not necessarily the same medium as in step 1520).

In a fourth preferred embodiment of the invention, the major steps (illustrated in FIG. 16) are again similar to those described above, but merit separate description. At step 1610 financial market transaction data is electronically received by a computer over an electronic network. At step 1620 the received financial market transaction data is electronically stored in a computer-readable medium accessible to the computer. At step 1630 a time series z is constructed that models the received financial market transaction data. At step 1640 a complex iterated exponential moving average operator EMA [τ; z], with kernel ema, is constructed (see Section 4.10). At step 1650 a time-translation-invariant, causal operator Ω[z] is constructed. Ω[z] is a convolution operator with kernel ω and time range τ, and is based on the operator constructed in step 1640. At step 1660 a windowed Fourier transform WF is constructed (WF is defined in terms of EMA; see Section 4.10). At step 1670 values of one or more predictive factors relating to said time series z are calculated by the computer. The predictive factors are defined in terms of the windowed Fourier transform WF. At step 1680 the values of one or more predictive factors calculated by the computer are stored in a computer readable medium (not necessarily the same medium as in step 1620).

Although the subject invention has been described with reference to preferred embodiments, numerous modifications and variations can be made that will still be within the scope of the invention. No limitation with respect to the specific embodiments disclosed herein is intended or should be inferred.

What is claimed is:

1. A method of obtaining predictive information for inhomogeneous financial time series, comprising the steps of:

constructing an inhomogeneous time series z that represents received financial market transaction data;

constructing an exponential moving average operator EMA[τ: z];

constructing an iterated exponential moving average operator based on said exponential moving average operator;

constructing a time-translation-invariant, causal operator Ω[z] that is a convolution operator with kernel ω and that is based on said iterated exponential moving average operator; and electronically calculating in a computer values of one or more predictive factors relating to said time series z, wherein said one or more predictive factors are defined in terms of said operator Ω[z].

2. The method of claim 1, wherein said operator Ω[z] has the form:

$$\Omega[z](t) = \int_{-\infty}^{t} dt' \omega(t-t')z(t')$$
$$= \int_{0}^{\infty} dt' \omega(t')z(t-t').$$

3. The method of claim 1, wherein said exponential moving average operator EMA[τ; z] has the form:

$$EMA[\tau; z](t_n) = \mu\, EMA(\tau; z](t_{n-1}) + (\nu - \mu)z_{n-1} + (1 - \nu)z_n, \text{ with} \quad (23)$$

$$\alpha = \frac{\tau}{t_n - t_{n-1}},$$

$$\mu = e^{-\alpha},$$

where ν depends on a chosen interpolation scheme.

4. The method of claim 1, wherein said operator Ω[z] is a differential operator Δ[τ] that has the form:

Δ[τ]=γ(EMA[ατ, 1]+EMA[ατ, 2]–2EMA [αβτ, 4]), where γ is fixed so that the integral of the kernel of the differential operator from the origin to the first zero is 1; α is fixed by a normalization condition that requires Δ[τ; c]=0 for a constant c; and β is chosen in order to get a short tail for the kernel of the differential operator Δ[τ].

5. The method of claim 4 wherein said one or more predictive factors comprises a return of the form r[τ]=Δ[τ; x], where x represents a logarithmic price.

6. The method of claim 1 wherein said one or more predictive factors comprises a momentum of the form x–EMA[τ; x], where x represents a logarithmic price.

7. The method of claim 1 wherein said one or more predictive factors comprises a volatility.

8. The method of claim 7 wherein said volatility is of the form:

Volatility[τ, τ', p; z]=MNorm[τ/2,p; Δ[τ'; z]], where MNorm[τ, p; z]=MA[τ; |z|$^p$]$^{1/p}$, and $$MA[\tau, n] = \frac{1}{n}\sum_{k=1}^{n} EMA[\tau', k], \text{ with } \tau' = \frac{2\tau}{n+1},$$

and where p satisfies 0<p≦2, and τ' is a time horizon of a return r[τ]=Δ[τ; x], where x represents a logarithmic price.

9. A method of obtaining predictive information for inhomogeneous financial time series, comprising the steps of:
constructing an inhomogeneous time series z that corresponds to received financial market transaction data;
constructing an exponential moving average operator;
constructing an iterated exponential moving average operator based on said exponential moving average operator;
constructing a time-translation-invariant, causal operator Ω[z] that is a convolution operator with kernel ω and that is based on said iterated exponential moving average operator;
constructing a standardized time series z; and
electronically calculating in a computer values of one or more predictive factors relating to said time series z, wherein said one or more predictive factors are defined in terms of said standardized time series z.

10. The method of claim 9 wherein the standardized time series z is of the form:

$$\hat{z}[\tau] = \frac{z - MA[\tau; z]}{MSD[\tau; z]},$$

where $$MA[\tau, n] = \frac{1}{n}\sum_{k=1}^{n} EMA[\tau', k], \text{ with } \tau' = \frac{2\tau}{n+1}, \text{ and}$$

where MSD[τ, p; z]=MA[τ;|z–MA[τ; z]|$^p$]$^{1/p}$.

11. The method of claim 9 wherein said one or more predictive factors comprises a moving skewness.

12. The method of claim 11 wherein said moving skewness is of the form:

MSkewness[τ$_1$, τ$_2$; z]=MA[τ$_1$; ẑ[τ$_2$]$^3$]

where τ$_1$ is the length of a time interval around time "now" and τ$_2$ is the length of a time interval around time "now–τ".

13. The method of claim 12 wherein the standardized time series ẑ is of the form:

$$\hat{z}[\tau] = \frac{z - MA[\tau; z]}{MSD[\tau; z]}$$

where $$MA[\tau, n] = \frac{1}{n}\sum_{k=1}^{n} EMA[\tau', k], \text{ with } \tau' = \frac{2\tau}{n+1},$$

and
where MSD[τ, p; z]=MA[τ;|z–MA[τ; z]|$^p$]$^{1/p}$.

14. The method of claim 9 wherein said one or more predictive factors comprises a moving kurtosis.

15. The method of claim 14 wherein said moving kurtosis is of the form

MKurtosis[τ$_1$, τ$_2$; z]=MA[τ$_1$; ẑ[τ$_2$]$^4$], where τ$_1$ is the length of a time interval around time "now" and τ$_2$ is the length of a time interval around time "now–τ."

16. The method of claim 15 wherein the standardized time series ẑ is of the form:

$$\hat{z}[\tau] = \frac{z - MA[\tau; z]}{MSD[\tau; z]}$$

where $$MA[\tau, n] = \frac{1}{n}\sum_{k=1}^{n} EMA[\tau', k], \text{ with } \tau' = \frac{2\tau}{n+1},$$

and
where MSD[τ, p; z]=MA[τ;|z–MA[τ; z]|$^p$]$^{1/p}$.

17. A method of obtaining predictive information for inhomogeneous financial time series, comprising the steps of:
constructing an inhomogeneous time series z that corresponds to received financial market transaction data;
constructing an exponential moving average operator EMA[τ; z];

constructing an iterated exponential moving average operator based on said exponential moving average operator EMA[τ; z];

constructing a time-translation-invariant, causal operator Ω[z] that is a convolution operator with kernel ω and time range τ, and that is based on said iterated exponential moving average operator;

constructing a moving average operator MA that depends on said EMA operator;

constructing a moving standard deviation operator MSD that depends on said MA operator; and electronically calculating in a computer values of one or more predictive factors relating to said time series z, wherein said one or more predictive factors depend on one or more of said operators EMA, MA, and MSD.

18. The method of claim 17 wherein said one or more predictive factors comprises a moving correlation.

19. The method of claim 18 wherein said moving correlation is of the form:

$$MCorrelation[\hat{y}, \hat{z}](t) = \int_0^\infty \int_0^\infty dt'dt''c(t', t'')\hat{y}(t-t')\hat{z}(t-t'').$$

20. A method of obtaining predictive information for inhomogeneous financial time series, comprising the steps of:

constructing an inhomogeneous time series z that corresponds to received financial market transaction data;

constructing a complex iterated exponential moving average operator EMA[τ; z], with kernel ema;

constructing a time-translation-invariant-, causal operator Ω[z] that is a convolution operator with kernel ω and time range τ, and that is based on said complex iterated exponential moving average operator;

constructing a windowed Fourier transform WF that depends on said EMA operator; and electronically calculating in a computer values of one or more predictive factors relating to said time series z, wherein said one or more predictive factors depend on said windowed Fourier transform.

21. The method of claim 20 wherein said complex iterated exponential moving average operator EMA has a kernel ema of the form:

$$ema[\zeta, n](t) = \frac{1}{(n-1)!}\left(\frac{t}{\tau}\right)^{n-1}\frac{e^{-\zeta t}}{\tau},$$

where $$\zeta = \frac{1}{\tau}(1+ik).$$

22. The method of claim 20 wherein EMA is computed using the iterative computational formula:

$$EMA[\zeta; z](t_n) = \mu EMA[\zeta; z](t_{n-1}) + z_{n-1}\nu - \frac{\mu}{1+ik} + z_n 1 - \frac{\nu}{1+ik}, \text{ with}$$

$$\alpha = \zeta(t_n - t_{n-1})$$

$$\mu = e^{-\alpha}$$

where ν depends on a chosen interpolation scheme.

23. The method of claim 20 wherein said windowed Fourier transform has a kernel wf of the form:

$$wf[\tau, k, n](t) = \frac{1}{n}\sum_{j=1}^n ema[\zeta, j](t).$$

24. The method of claim 23 wherein said ema is of the form:

$$ema[\zeta, n](t) = \frac{1}{(n-1)!}\left(\frac{t}{\tau}\right)^{n-1}\frac{e^{-\zeta t}}{\tau}$$

where $$\zeta = \frac{1}{\tau}(1+ik).$$

25. A method of obtaining predictive information for inhomogeneous time series, comprising the steps of:

constructing an inhomogeneous time series z that represents time series data;

constructing an exponential moving average operator;

constructing an iterated exponential moving average operator based on said exponential moving average operator;

constructing a time-translation-invariant, causal operator Ω[z] that is a convolution operator with kernel ω and that is based on said iterated exponential moving average operator; and electronically calculating in a computer values of one or more predictive factors relating to said time series z, wherein said one or more predictive factors are defined in terms of said operator Ω[z].

* * * * *